United States Patent [19]
Kerman

[11] 3,872,262
[45] Mar. 18, 1975

[54] KEY TELEPHONE SYSTEM

[76] Inventor: Stephen Kerman, 1736 Poplar St., Merrick, N.Y. 11566

[22] Filed: Oct. 9, 1973

[21] Appl. No.: 404,694

[52] U.S. Cl. ........... 179/99, 179/18 BC, 179/18 AD
[51] Int. Cl. ........................................... H04m 1/60
[58] Field of Search ... 179/99, 18 BC, 1 CN, 18 AD, 179/27 FB

[56] References Cited

UNITED STATES PATENTS

| | | | |
|---|---|---|---|
| 3,427,407 | 2/1969 | Heck et al. | 179/99 |
| 3,723,654 | 3/1973 | Bunce et al. | 179/99 |
| 3,743,791 | 7/1973 | Duff et al. | 179/99 |
| 3,787,640 | 1/1974 | Bush et al. | 179/99 |

*Primary Examiner*—Kathleen H. Claffy
*Assistant Examiner*—Gerald L. Brigance
*Attorney, Agent, or Firm*—Kenyon & Kenyon Reilly Carr & Chapin

[57] ABSTRACT

A key telephone system includes a plurality of internal communications line circuits for providing talking paths among the key telephone sets of the system, and an operator-attended key telephone set which incorporates direct station selection apparatus for directly connecting the operator-attended set to all other key telephone sets in the system.

1 Claim, 20 Drawing Figures

KEY TELEPHONE SYSTEM

BACKGROUND OF THE INVENTION

The invention relates to key telephone systems. Such systems conventionally include a key service unit and a plurality of key telephone sets. The key service unit comprises a plurality of central office ("CO")-PBX line circuits to which are coupled a like plurality of central office and/or PBX lines (hereinafter called "office lines"). Each key telephone set is equipped with a plurality of CO line keys which allow the user of the key telephone set to select any idle office line.

However, one limitation of prior key telephone systems is the lack of adequate internal communications or intercom capability among the key telephone sets in the system. This limitation becomes more significant as the number of key telephone sets in the system increases.

Moreover, as the number of key telephone sets in the system increases, it becomes desirable to provide apparatus for utilizing one key telephone set as an operator-attended station for handling the answering of incoming calls and the routing thereof to other key telephone set stations. However, conventional apparatus of this kind is complicated to operate and requires extensive operator training.

SUMMARY OF THE INVENTION

It is, therefore, an object of the invention to provide a novel key telephone system wherein intercommunication among key telephone sets therein is enhanced by the provision of register apparatus for interconnecting calling and called key telephone sets via an intercom line circuit. The audible signalling devices employed at each key telephone set are microphones, loudspeakers and appropriate amplification and voice controlled circuitry, activated automatically when the set is called. This permits the called party to reply without manipulation of controls at the key telephone set.

It is a further object of the invention to provide a novel key telephone system wherein an operator-attended key telephone set station has direct access to each other key telephone set in the system.

Other and further objects of the invention are clear from the following description thereof, and appended claims.

DETAILED DESCRIPTION OF PREFERRED EMBODIMENTS

Figure 11:
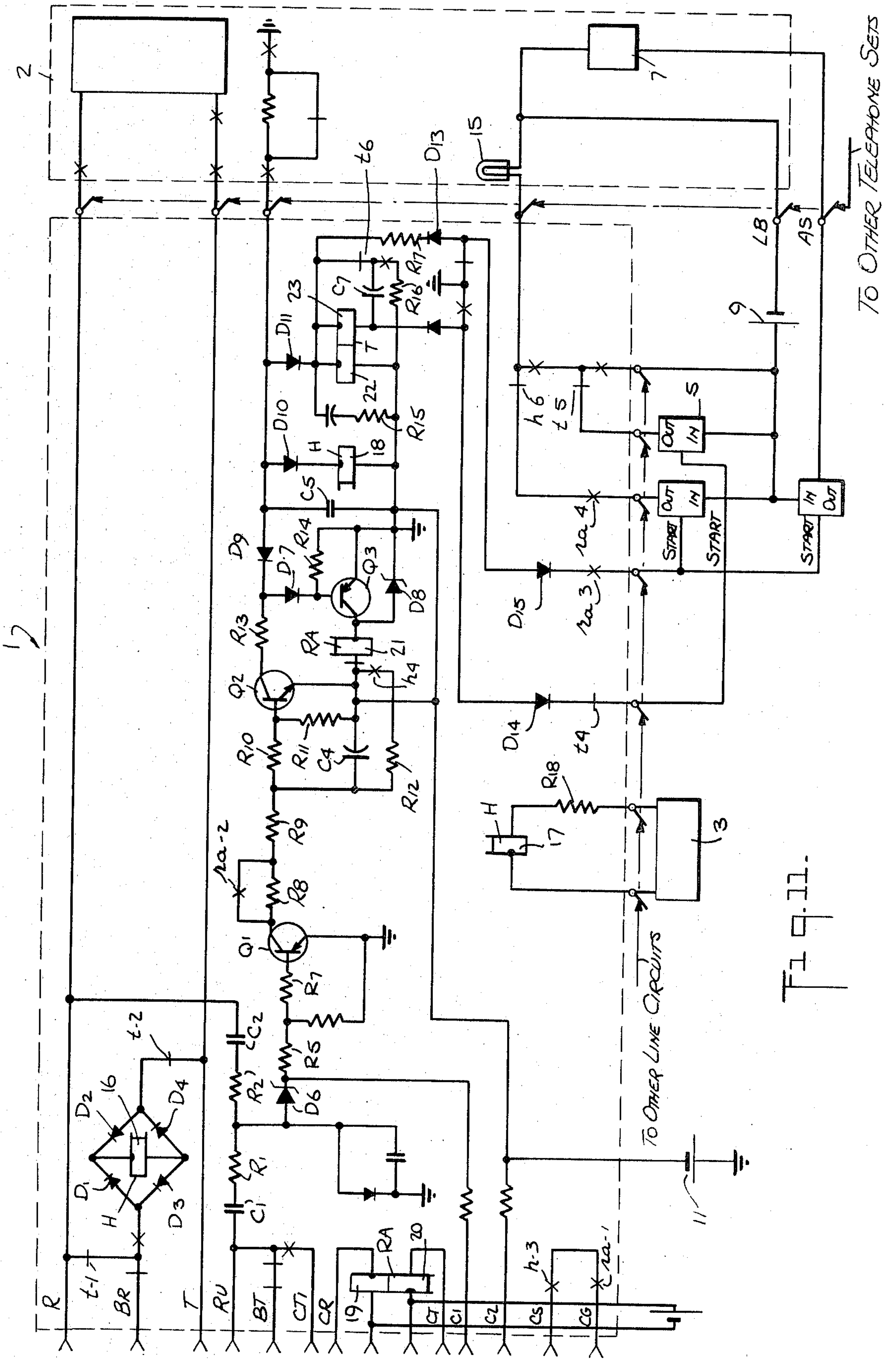
FIG. 11 is an electrical schematic and block diagram illustrating one embodiment of a universal subscriber's line circuit, for key telephone system use.
Figure 13:
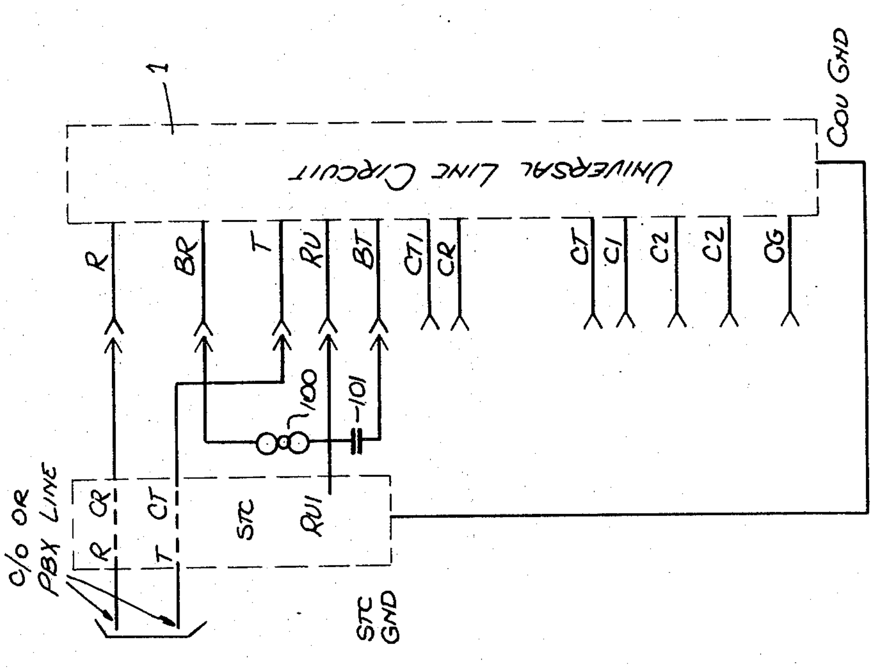
FIG. 13 is an electrical schematic and block diagram illustrating the necessary electrical connections to the line circuit of FIG. 11, when that line circuit is connected to a central office or PBX line through conventional station coupler (STC) interface equipment.

The following detailed description of preferred embodiments of a key telephone system includes:

I. Introduction
II. Key Telephone Set
  A. Voice Switching Circuit
  B. Monitoring Circuit
  C. Additional "Handsfree" Talking Features of Key Telephone Set
III. Voice Communication On Office Line Connected to Key Telephone System
  A. Exclusion Circuit
  B. Universal Line Circuit In Key Service Unit
    a. Incoming Call Indications (FIGS. 11, 12)
    b. Incoming Call Indication (FIGS. 11, 13)

c. Incoming Call Indication (FIGS. 11, 14)
d. Incoming Call Answering (FIGS. 11, 12, 13)
e. Incoming Call Answering (FIGS. 11, 14)
f. Call Holding (FIGS. 11, 14)
g. Call Holding (FIGS. 11, 14)
h. Call Answering After Holding
i. Call Completion
j. Outgoing Call IV. Voice Communication on Intercom Line In Key Telephone System
A. Register Circuit
B. Switching Circuit
C. Interrupter Circuit V. Direct Station Selection Intercom Communication
A. Particular Features of DSS Apparatus VI. Conclusion

I. Introduction

Figure 2:
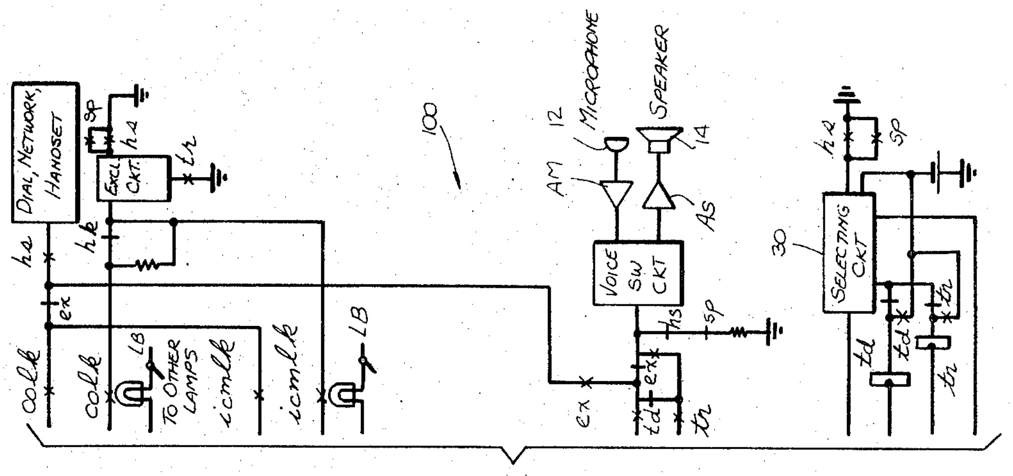
FIG. 2 illustrates, in block diagram and electrical schematic form, a portion of the apparatus in a key telephone set used with the key service unit shown in FIG. 1.
Figure 1:
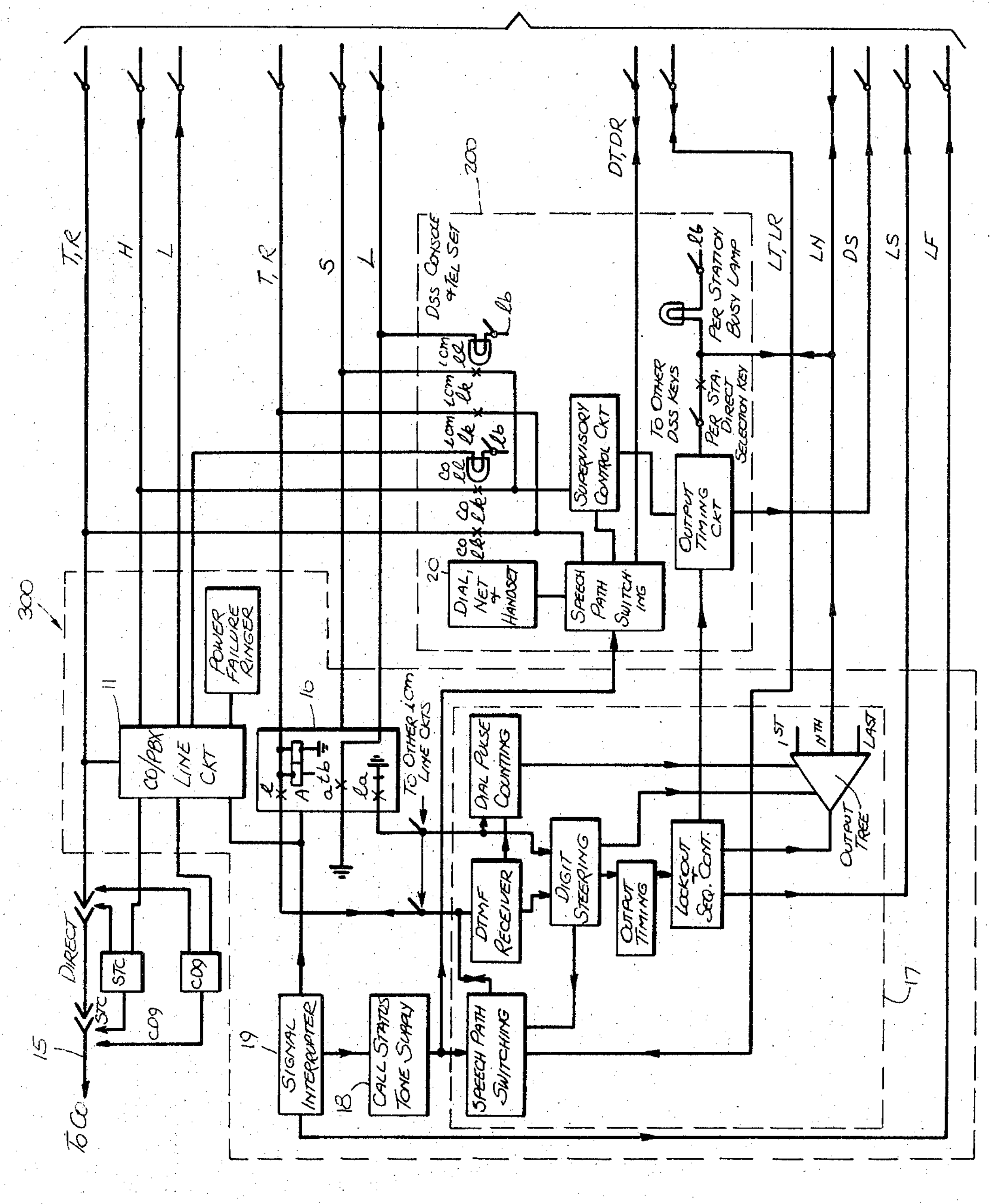
FIG. 1 illustrates, in block diagram and electrical schematic form, a portion of the key service unit and an operator-attended key telephone set in the key telephone system constructed in accordance with the invention.

Before considering in detail the key telephone system shown in FIGS. 1, 2, it is noted that conventional key service unit and key telephone set apparatus which plays no direct part in the present invention is not shown. Such apparatus and the operation thereof are well known to those of skill in the art. Moreover, where appropriate, the conventional notations of detached contact schematics have been used in the drawings. In addition, T and R leads are where convenient shown in the drawings as single paths rather than as two separate paths, as is the case. It is to be understood that relay, key or other switch contacts illustrated in such single paths, appear in both paths.

II. Key Telephone Set

Referring to FIG. 2, a key telephone set 100 comprises conventional dialing apparatus, transmission network and handset 10, and a plurality of CO line keys (not shown), one of whose set of contacts, COLK, are shown. A plurality of key telephone sets can be connected in the system constructed in accordance with this invention. Although conventional line key apparatus can be used, it is preferred to use the key assembly described in copending application, Ser. No. 341,200, filed on Mar. 14, 1973, by Isao Kunimine, entitled "INTERLOCKING PUSHBUTTON KEYS FOR A KEY TELEPHONE SET." The respective CO line key contacts COLK are connected via T, R, H and L leads to a line circuit 11 (FIG. 1), located in the key service unit 300. Although a conventional line circuit can be used, it is preferred to use the line circuit described in the copending patent application. Ser. No. 341,209, filed on Mar. 14, 1973, by Stephen Kerman and Tsuyoshi Shinoi, entitled "UNIVERSAL SUBSCRIBER'S LINE CIRCUIT IN A KEY TELEPHONE SYSTEM." Such line circuit is described below in detail with reference to FIGS. 11–14. A plurality of office lines can be connected in the key telephone system of the present invention.

The key telephone set 100 additionally includes speakerphone apparatus comprising a microphone 12, and transmitting amplifier AM therefor, a loudspeaker 14, and driving amplifier AS therefor, and a voice path switching circuit. Although conventional voice path switching circuits can be used, it is preferred to use the voice-path switching circuit described in copending patent application, Ser. No. 344,218, filed on Mar. 23, 1973, by Tsuyoshi Shinoi and Toyoshige Murakami, entitled "AUTOMATIC VOICE-PATH SWITCHING CIRCUIT FOR A SPEAKERPHONE TELEPHONE SET." Use of the latter switching circuit allows completely hands free communication to be effected at each key telephone set 100 connected in the system. As is completely described below, the voice switching circuit is in its transmitting mode when no signal = are present. Accordingly, to initiate a call, the user of set 100 needs merely to operate an appropriate line key and "on" key (not shown) (and the dialing apparatus), without use of the handset to complete the required voice transmission and reception paths.

A. Voice Switching Circuit

Figure 3:
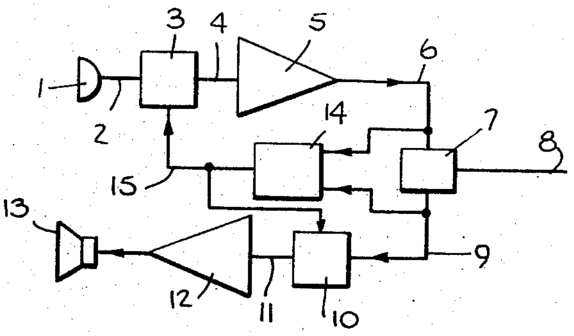
FIG. 3 is a block diagram of a loudspeaking telephone set which incorporates an automatic voice-path switching circuit.

In particular, referring to FIG. 3, sound enters a speakerphone through microphone 1, and is converted to an electrical signal, which passes through line 2 and a transmitting switch circuit means 3. This voice-representative signal is then amplified by transmitting amplifier 5, and after passing through hybrid coil 7 is sent to the connected subscriber over line 8. The voice-representative signal received at the speakerphone from the other subscriber talking on line 8 is fed from the hybrid coil 7 to receiving switch circuit means 10. This signal is coupled to the input of receiving amplifier 12, which drives speaker 13.

The operation of voice switch circuits 3, 10 switches the speakerphone back and forth between the transmitting and receiving modes. Automatic control of the circuits 3, 10 is accomplished by a level comparison circuit means 14, which compares the magnitude of the voice signal transmitted on line 6 with the magnitude of the voice signal received on line 9. The control signal derived from this comparison, a magnitude difference-representative signal, is amplified, and coupled on line 15 to the respective control inputs of switch circuit means 3 and 10. When the transmitted signal is greater in magnitude than the received signal, circuit means 3 operates to couple the local user's voice signal to amplifier 5, and circuit means 10 blocks the received voice signal from amplifier 12. However, when the received signal magnitude is greater than the magnitude of the signal to be transmitted, the received voice signal is coupled to amplifier 12 by circuit means 10. At the same time, circuit means 3 blocks the generated voice signal from amplifier 5.

In general, the voice signal of the first party to talk determines the speakerphone's mode, i.e., transmitting or receiving; the mode is not changed unless the other party speaks louder, or until the first party stops talking. With the circuit arrangement used herein, however, if transmitting switch circuit means 3 is not normally in a predetermined state of partial conduction, no transmitted signal would ever appear on line 6, and it would be impossible to switch the speakerphone to a transmitting mode by means of a voice signal generated at the speakerphone. The automatic voice-path switching circuit is one that gives an ideal switching characteristic with a stable condition of partial transmission, during a condition of no voice signal generation or reception, that is, when the speakerphone is quiescent. This permits the circuit to switch to a fully transmitting condition.

Figure 4:
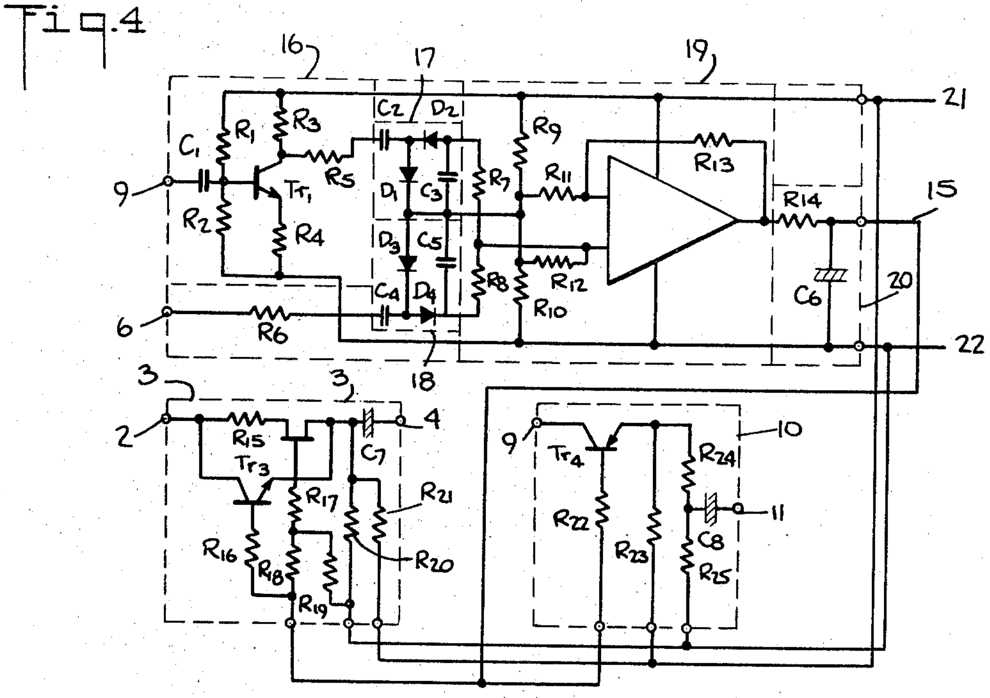
FIG. 4 is an electrical schematic of one embodiment of an automatic voice-path switching circuit.

Referring to FIG. 4, the circuit details of one embodiment are shown. In particular, the level comparison circuit means 14 comprises an auxiliary voice-receiving amplifier means 16, a voice-receiving rectifier circuit means 17, a voice-transmitting rectifier circuit means 18, a high gain d-c amplifier circuit means 19 and time constant circuit 20. In combination, these circuits generate a control signal which is coupled on line 15 to the inputs of switch circuit means 3 and 10.

In particular, the voice signal output of amplifier 5 is coupled by resistor R6 to rectifier circuit means 18, which comprises coupling capacitor C4, diodes $D_3$, $D_4$, and by output capacitor C5. The received voice signal from line 8 is coupled by capacitor C1 to amplifier means 16, which comprises transistor TR1 and resistors R1, R2, R3, R4, R5. The output of amplifier means 16 is coupled to rectifier means 17, which includes coupling capacitor C2, diodes D1, D2 and output capacitor C3.

In operation, the rectified positive half-cycles of the voice signal generated at the speakerphone, and the negative half-cycles of the received voice signal are added together in the resistance network comprising resistors R7, R8, R9, R10, R11, R12. A signal representative of the difference in magnitude between the generated and received voice signals is thereby obtained, and is amplified by a high gain d-c amplifier means 19, which includes a feedback resistor R13. This amplified signal is then coupled as a control signal from an R-C network, resistor R14 and capacitor C6, to the switch circuit means 3, 10.

Transmitting switch circuit means 3 comprises parallel switching circuit branches, which have different switching thresholds and different conduction, or on-state, losses. These branches comprise first, a depletion type N channel field effect transistor TR2, having a resistor 15 connected in series therewith, with, and second, a bipolar NPN transistor TR3, which shunts transistor TR2 and resistor R15. Receiving switch circuit means 10 comprises a PNP transistor TR4.

The drain and emitter of transistors TR2 and TR3, respectively, and the emitter of transistor TR4 are connected to a predetermined reference voltage. The control signal developed by the level comparison circuit 14 is subtracted from the reference voltage. In general, when the difference is negative, both transistors TR2 and TR3 conduct, and a voice signal transmission path between terminals 2, 4 of switch circuit 3 is established. At the same time, transistor TR4 is cut-off by this sum representative voltage, so that the voice signal transmission path between terminals 9, 11 of switch circuit means 10 is opened. The opposite results obtain when the sum of control and reference voltages is positive.

Figure 5:
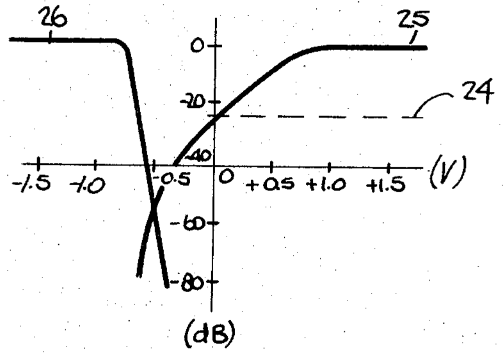
FIG. 5 is a graph showing the transmission gain in decibels, as a function of the difference in voltage between the control signal and the reference voltage, of the transmitting and receiving switching means incorporated in the apparatus shown in FIGS. 3, 4.

In one embodiment, the reference voltage is predetermined at a value signal to one-half of the power source voltage applied between terminals 21, 22 (FIG. 4). This voltage is obtained in the transmitting switch circuit 3 by means of a voltage dividing network comprising resistors $R_{20}$, $R_{21}$, and in the receiving switch circuit 10 by means of a voltage dividing network comprising resistors 23, 24, 25. The transmission characteristics of resistor R15 and transistor TR2 on the one hand, and transistor TR3 on the other, are predetermined so that transistor TR2 is in the conductive state and transistor TR3 is off when voice signal is neither being transmitted or received. These characteristics are shown in FIG. 5. The abscissae show the difference signal voltage values obtained by subtracting the comparison circuit control voltage from the reference voltage, and the ordinates show the transmission losses through the transmitting switch circuit 3 (curve 25, which is the sum of curves 23, 24, the transmission losses of the transistor TR3 circuit branch, respectively), and the receiving switch circuit 10 (curve 25). The switch circuits 3, 10 are so proportioned that at the point where the difference voltage is zero volts, transistors TR3 and TR4 are both off, and transistor TR2 is on.

In this condition, the transmission characteristic of transmitting switch circuit 3 is equal to the transmission characteristic of the circuit branch comprising transistor TR2 and resistor R15, which is the ratio of output voltage at terminal 4 to input voltage at terminal 2 ($Vol/_{Vi}$):

$$\frac{V_o}{V_i} = \frac{R_{20} \quad R_{21}}{R_{15}\,(R_{20} + R_{21}) + R_{20} \quad R_{21}}$$

By appropriate selection of resistor values, the d-c potentials of the drain of transistor TR2 and the emitter of transistor TR3 are held at one-half the voltage of the power source. Hence, the amount of signal attenuation through the transmitting switch circuit means 3, at the point where the difference voltage (V) is zero, can be calculated. By appropriate selection of components, this loss is predetermined at −26 dB, a value at which the switch circuit 3 can be operated by locally generated voice signals, but not ambient noise.

Thus, the actual transmitting-receiving transistion switching point, that is, the point at which transistor TR4 starts to conduct and transistor TR2 begins to go off, is at a point a little lower than the value of the preselected reference voltage.

When the speaker phone is idle, the output of level comparison circuit means 14 is in the no signal state, and is stabilized at the reference voltage. The transmitting switch circuit 3 introduces at −26 dB loss, and the receiving switch circuit 10 introduces at its maximum loss. Any ambient noise picked up through the microphone 1 is attenuated by 26 dB before being transmitted on line 8. Because of this 26 dB attenuation compared to the normal transmitting state, this noise level is equivalent to that picked up by the handset of a telephone.

In this condition, when voice sound enters the microphone, the generated voice signal is also attenuated by 26 dB, and is transmitted by the transmitting amplifier 5 and hybrid coil 7 to the line 8. At the same time, the voice signal output of amplifier 5 is fed as an input signal to the signal rectifying circuit 18 of level comparison circuit means 14, and a positive d-c voltage is thereby generated. The output of high gain d-c amplifier 19 then becomes more positive than the reference voltage. Because this amplifier d-c signal is applied to the switch circuit means 3 and 10 by the same time constant circuit $R_{14}$, $C_6$, the switch circuit means 10 remains in a state of maximum loss.

However, transistor TR3 is biased into conduction; the collector-emitter circuit of transistor TR3 then short circuits the transmission path through resistor R15 and transistor TR2. The amount of attenuation through the transmitting switch circuit means 3 then decreases to zero, and voice transmission is sent at maximum output from hybrid coil 7 to the line 8. Moreover, there is no unnaturalness of conversion during the time period that the switch circuit means 3 transmission loss goes from −26 dB to zero dB. Since there is only an attenuation loss on the order of 26 dB introduced at the very beginning of the conversation, chopping or clipping is avoided. Even if the conversation is begun in a low voice, the first part of the conversation is not cut-off. This is a particularly important advantage of the automatic voice-path switching circuit.

When an incoming voice signal is received on line 8, it is coupled to the receiving switch circuit means 10 and the auxiliary receiving amplifier 16 of the level comparison circuit means 14. The negative-going half-cycles of the amplified voice signal are rectified by rectifying circuit means 17. This d-c signal is added to the output of the transmitting rectifying circuit means 18, which as described above rectifies the positive-going half-cycles of the transmitted signal, and the sum-representative signal is applied to the d-c amplifier 19, and is coupled via the time constant circuit $R_{14}$, $C_4$ to the transmitting and receiving switch circuit means 3, 10.

If the incoming voice signal is higher in level than the outgoing voice signal, the control voltage applied to switch circuit means 3, 10, becomes more negative than the reference voltage. Transistors TR2 and TR3 are thereby cut-off, and the transmitting switch circuit means 3 then goes into a maximum loss condition. At the same time, transistor TR4 is biased into conduction, and the receiving switch circuit means 10 insertion loss decreases to zero. The incoming voice signal is then coupled by switch means 10 to the receiving amplifier 12 and drives speaker 13; on the other hand, the switch means 3 blocks transmission of voice signals from the microphone to amplifier 5. The switching time for this transmit-to-receive transition is determined by the difference in levels of the signal inputs to the comparison circuit means 14. In the idle state, for example, the microphone signals produced by any ambient noise are attenuated 26 dB, while the received signal path is coupled without attenuation to the comparison circuit. If a signal is received, the difference in these two levels will be large and the circuit will switch quickly to the receiving state. Further, since in the receiving state transmitting switch circuit means 3 is completely cut off, signals generated by the microphone in response to sounds from the speaker due to acoustic coupling will not reach the comparison circuit means 14, and therefore unlike prior apparatus, false voice switching cannot occur, and the received signal can be reproduced at the desired acoustic level without regard to the proximity of the microphone.

When a voice-path switching circuit is used in the speaker phone, it is impossible to have completely simultaneous conversation, but naturalness of conversation is preserved by giving priority to the side that talks first, or during transmitting, loudest. Because a high gain amplifier is incorporated in the level comparison circuit means 14, the time constant of circuit $R_{14}$, $C_4$ can be made smaller without worrying about cutting off word endings, so that it is possible for one party to interrupt the other quite easily and therefore to converse quite naturally by means of the speaker phone here described.

In addition, each key telephone set 100 (FIG. 2) may include the monitoring apparatus described in copending patent application Ser. No. 348,286, filed on Apr. 5, 1973, by Stephen Kerman, Mikihiro Ichikawa and Kazuryuki Gotoh, entitled "A TELEPHONE CALL LOUDSPEAKER MONITORING AND RELAY CONTROL CIRCUIT," and the switching circuit described in copending patent application, Ser. No. 344,212, filed on Mar. 23, 1973 by Tsuyoshi Shinoi and Toyoshige Murakami, entitled "A HANDS FREE LOUDSPEAKING KEY TELEPHONE SET AND A SWITCHING CIRCUIT FOR USE IN A MICROPHONE AND LOUDSPEAKER EQUIPPED KEY TELEPHONE."

B. Monitoring Circuit

Figure 6:
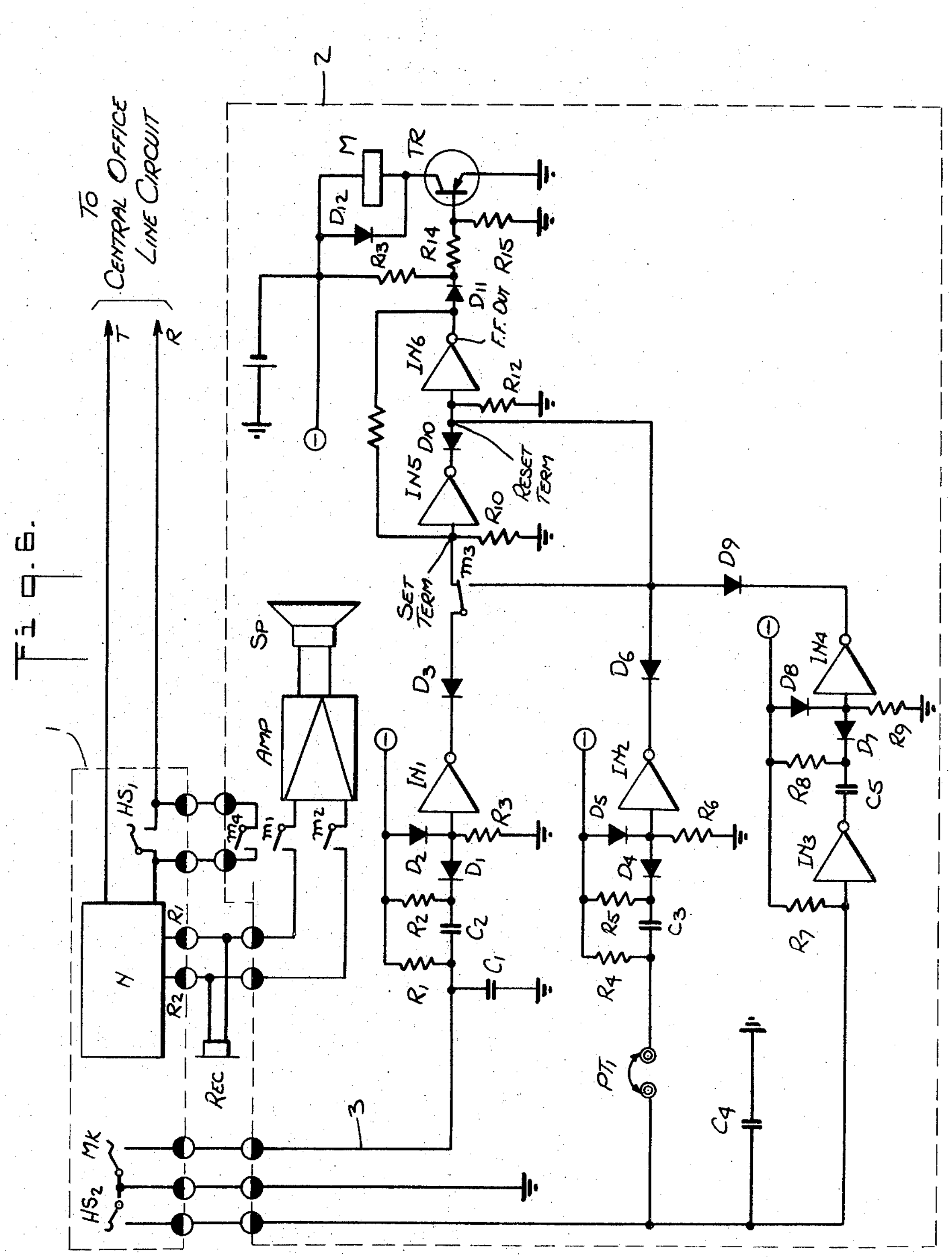
FIG. 6 is a schematic circuit diagram of a telephone call loudspeaker monitoring and relay control circuit.

In particular, referring to FIG. 6, which illustrates a telephone call loudspeaker, monitoring and relay control circuit, a key telephone set is indicated by the dashed line 1. A standard telephone network N, within the telephone, has two hookswitch contacts HS1 and HS2. A non-locking type monitor key switch MK is mounted, for example, on the front panel of the telephone. Lines T and R connect to the telephone central office. The circuit surrounded by dashed lines 2 includes the circuit controlling the binary operation of relay M. Speaker SP and amplifier AMP mounted within the circuit 2 are for monitoring the call. Ordinary resistors R1 to R15, capacitors C1 to C15, and diodes D1 to D11 are provided with their functions explained in greater detail infra. Inverters IN1 through IN6 are of MOS IC construction with their gate terminals connected to ground (zero voltage), and their drain terminals, through load resistors, connected to the negative voltage terminals, through load resistors, connected to the negative voltage terminal of the power source E. In operation in the circuit, a voltage is fed to the gates of the inverters turning the inverters on and driving their outputs to a zero voltage level. If the gating input is less than a predetermined "on" level, the inverters are cut off and their output is at the negative voltage of E.

The transistor, TR, is a common PNP type transistor, used as a relay driver. A standard 24 volt M type relay is used and its contacts are shown as make contacts ***m*1, *m*2 and *m*4, and transfer contact *m*3.**

During the operation of the circuit an audio voice signal from the telephone network 1 receiver circuit R1 and R2 is applied as an input to amplifier AMP through the make contacts ***m*1, and *m*2, and monitored through speaker SP. Contact *m*4 operates whether or not hookswitch contact HS1 is closed, i.e., whether or not the telephone handset is lifted. Thus when hookswitch HS1 is open and the handset is not raised, contact *m*4** makes and the network circuit N operates as if the handset were raised, and hookswitch contact HS1 closed. PT1 is a jumper connection between terminals. Jumper PT determines whether or not the relay will be switched from the operated to the released state when hookswitch contact HS2 makes.

The detailed operation of the circuit is now explained by reference to FIGS. 6 and 7.

Initially, when a call is to be made through the central office over circuit T and R, the user lifts the handset of the telephone, hookswitch contacts HS1 and HS2 close, connecting leads T and R to telephone network N permitting the telephone set to operate in the conventional manner. The central office line is thereby seized, dial tone is heard in the handset, and dialling may now occur.

The MK key (not shown) can be operated closing the MK contact instead of lifting the handset. In response to this relay M operates as is hereinafter described. The *m*4 contact closes, completing a circuit from the R lead to the network N, thereby seizing the central office line and preparing the network for dialing in the same manner as the closing of hookswitch contact HS1. The $m1$ and $m2$ contacts connect the amplifier input across the receiver leads R1 and R2 of the network N so that audio signals received on the T and R leads, such as dial tone, is reproduced by the loudspeaker SP. Dialing can then proceed.

The operation of MK applies ground to lead 3 and charges capacitor C2 through resistor R2. The negative voltage previously applied to the gate of inverter IN1 through resistor R2 and diode D1 is shunted down by the charging of C2. As a result inverter IN1 is turned off momentarily and its output voltage rises from zero to a negative voltage −E.

As capacitor C2 becomes charged, the gate voltage at inverter IN1 rises to a negative value and inverter IN1 is turned on with its output returning to zero. The output of IN1 is, therefore, a pulse of voltage −E and width $t1$ shown by curve (*b*) of FIG. 7, while operation of the key MK is shown by curve (*a*). When monitor key MK is pushed and MK makes, the output of inverter IN1 is a negative pulse of duration $t1$. Should monitor key MK be held longer than time $t1$, the duration of the pulse will not change because $t1$ is determined solely by the time constant of capacitor C2 and resistor R2.

When monitor key MK is released, contact MK breaks, and capacitor C2 is discharged through resistors R1 and R2 and then recharges in the opposite direction through resistors R1 and R3 and diode D1, returning to its previous state. As a result each time monitor key MK is pressed and contact MK makes, the output of inverter IN1 is a negative pulse of −E volts and time span $t1$.

The R-S FF circuit is constructed from inverters IN5 and IN6, with the inverter IN5 input the "set" terminal, the input to inverter IN6 the "reset" terminal, and the output of inverter IN6 the "FF" output. The "set" condition is defined as the period when inverter IN5 is "on," and inverter IN6 is "off," i.e., when the output is −E volts. The "reset" condition occurs when inverter IN5 is "off" and inverter IN6 is "on," or in other words when the output is zero volts. The R-S FF is normally left in the "reset" state.

When the −E volt pulse of time span $t1$, produced at the inverter IN1 output terminal by pressing monitor key MK enters the "set" terminal, inverter IN5 is turned "on." Inverter IN5 turning "on," through "off" inverter IN6 and its output becomes −E volts. The −E volt output of IN6 is fed back through resistor R11 to the input of inverter IN5, keeping IN5 turned "on" and thereby keeping the R-S FF in a "set" condition even after the output from IN1 returns to zero volts at the end of time $t1$.

When the R-S FF is "set" and its output becomes negative, transistor TR of the relay driver circuit is turned on, current flows through the coil of relay M, relay M operates, and contacts $m1$ to $m4$ operate. Thus relay M operates with FF in the "set" state. In FIG. 6, FF is shown in the reset state, and therefore contacts $m1$ and $m4$ are released.

When the FF is "set" by the output pulse from inverter IN1, relay M operates, contact $m3$ transfers and the output terminal of inverter IN1 is connected to the "reset" terminal of the FF.

If the "reset" input to inverter IN6 becomes −E volts, while the FF is in the "set" condition, inverter IN6 will go on and its output will become zero. Because there will then be no minus voltage at the input to inverter IN5, it will be turned off and supply −E volts to the input of inverter IN6, which will keep the FF in the "reset" state.

Figure 7:
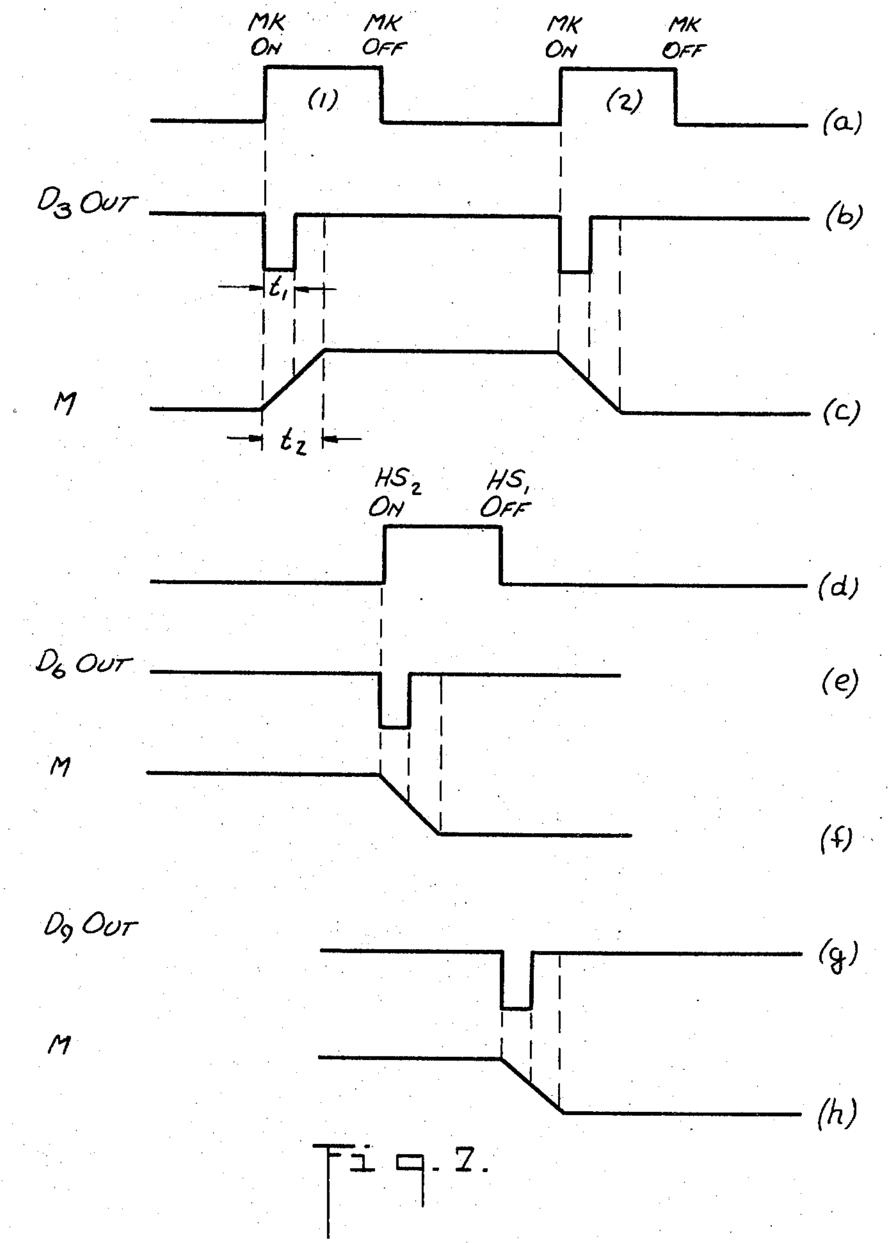
FIG. 7 is a graph illustrating the voltage waveforms produced in the circuit shown in FIG. 6, plotted against time.

FIG. 7 (*c*) is curved illustrating the operation of relay M, designed to operate in the time span, $t2$, longer than the output time span $t1$ of inverter IN1. If the operate time $t2$ of relay M is less than or equal to time $t1$, the set pulse will be applied first to the "set" terminal and then to the reset terminal upon the operation of contact $m3$ thereby preventing the circuit's proper operation. Therefore, it is necessary for the values of resistor R2 and capacitor C2 to be such that $t1 < t2$.

When this condition is satisfied and monitor key MK is pushed, relay M operates, and contacts $m1$ to $m4$ make. With this condition, because contacts $m1$ and $m2$ are made, the audio signals from the leads T and R enter amplifier AMP via network N and are monitored at speaker SP. When monitor key MK is pushed a second time, a second pulse shown as (2) on curve (*a*) is generated which appears at the reset terminal of FF as described previously, FF returns to its reset condition and relay M is released. This is shown in the curve of FIG. 7 (*c*).

FIG. 7 curves (*d*), (*e*), (*f*), (*g*) and (*h*) illustrate the operation of the circuit in response to hookswitch contact HS2. Since the operation of the inverters IN2, IN3 and IN4 is identical to what was described above for the operation of monitor switch MK, the details will be omitted.

When HS2 closes, if jumper PT1 is connected, a reset pulse will be generated by IN2, releasing thereby relay M so that a connection established by dialing with the handset on hook can be transferred to the handset for two-way conversation merely by lifting the handset. Monitoring may be restarted while the handset is in use by pressing the MK key once more after lifting the handset.

On the other hand, when the handset is replaced after use, IN3 and IN4 generate a reset pulse to once again turn-off transistor TR and release M, so that the call may be easily terminated.

If jumper PT1 is omitted, the closing of contact HS2 will not generate a reset pulse and the monitoring circuit, if "on," will stay on until the HS2 contacts open and the IN3 and IN4 inverters generate a reset pulse to turn it "off."

As described above, the operating circuit enables relay M to be alternately operated and released by the connection of the switching contact $m3$ of relay M at the input terminals of the R-S FF circuit, alternately changing its connection between the set and the reset terminals of the FF circuit each time a single pulse enters the input terminal at contact $m3$. Thus, it is possible to produce a relay drive circuit capable of imparting binary operation to a relay simply by an assembly of an FF circuit and a single relay contact without requiring a complex circuit.

C. Additional "Handsfree" Talking Features of Key Telephone Set

Figure 8:
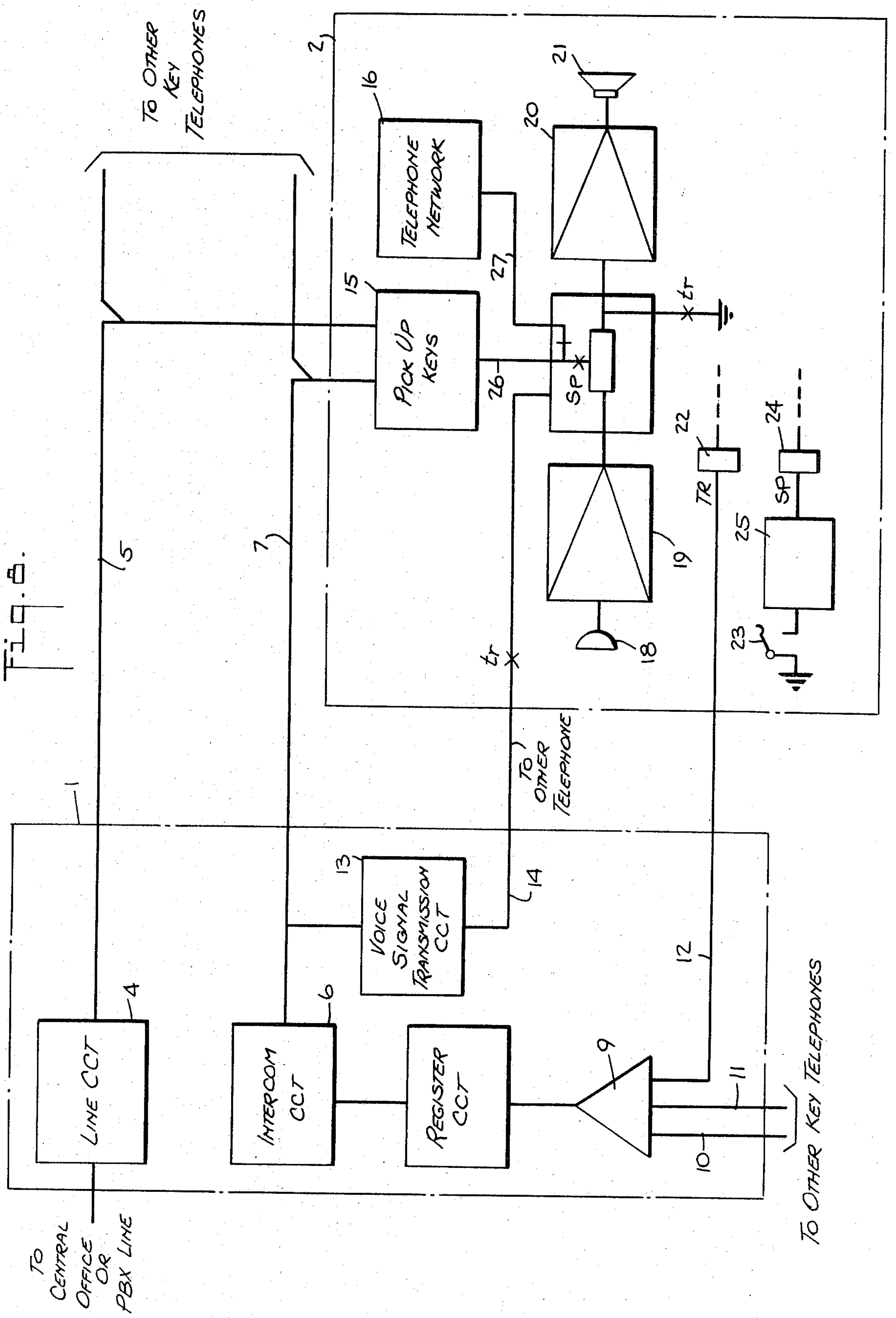
FIG. 8 is a block diagram of a key telephone system incorporating a microphone, loudspeaker (key) telephone and switching circuit to permit hands-free conversation.
Figure 9:
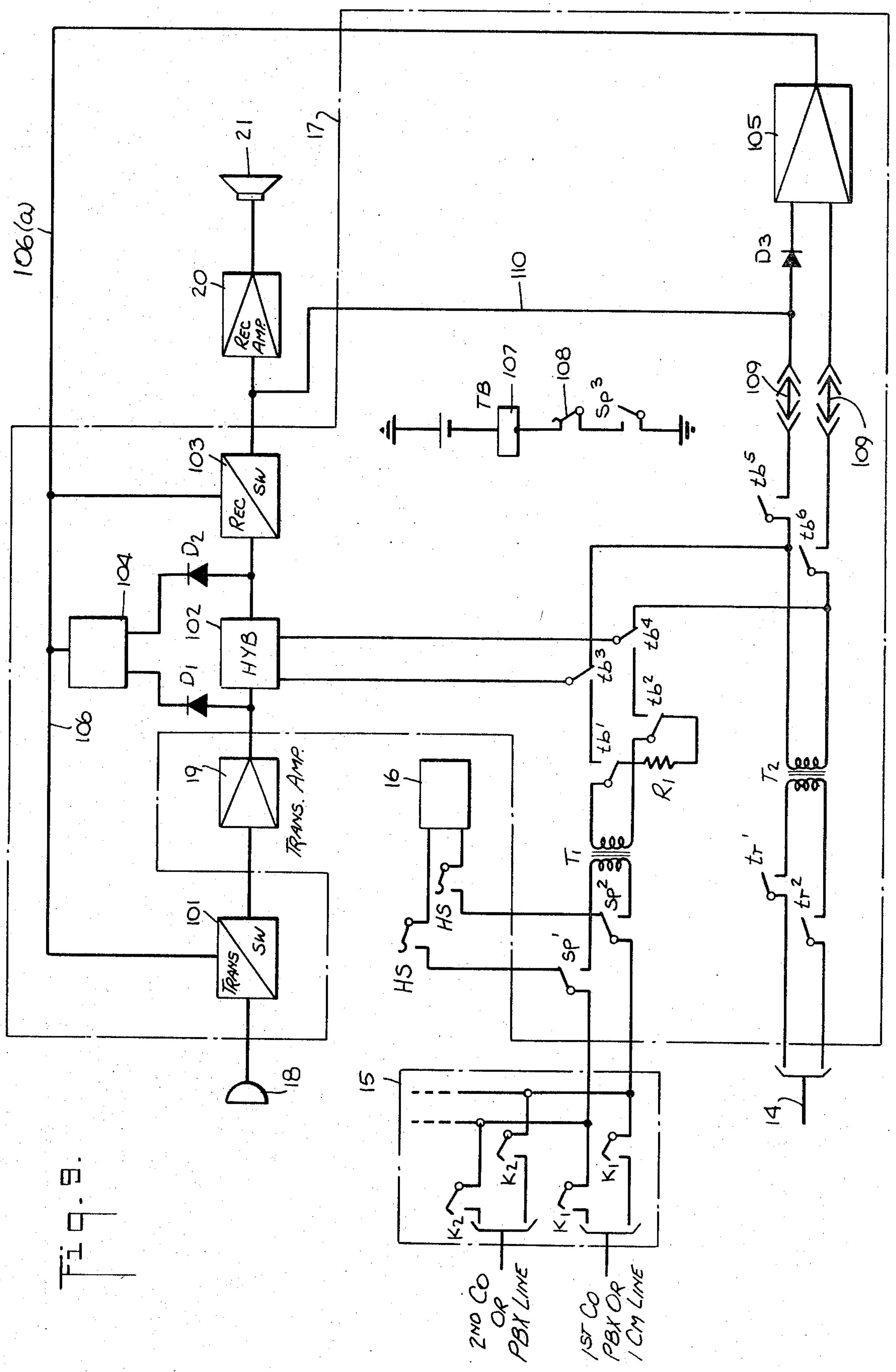
FIG. 9 is a block diagram of a microphone equipped key telephone set of the kind shown in FIG. 8, showing in greater detail the components used therein.

Furthermore, referring to FIGS. 8 and 9, which illustrate a handsfree loudspeaking key telephone set and a switching circuit for use in a microphone and loudspeaker equipped key telephone set, a key service unit 1 is interconnected to one of a plurality of key telephone sets 2 having both a microphone 18 and speaker 21. The central office or a PBX line is connected to the key service unit 1 by line 3 through a line circuit 4. A pair of line conductors 5 identical to 3 are extended between each key telephone set 2 and the key service unit 1. An intercom line circuit 6 including a battery feed relay is connected by a pair of line conductors 7 to the intercom line key contacts of each key telephone set 2. A register circuit 8, connected to intercom circuit 6, counts the dial pulses and responds to other signals from intercom circuit 6. Output tree circuit 9 receives the output of the register 8 and selects the desired one of the register outputs 10 through 12 corresponding to the dialed key telephone set. In order to couple the speaker and microphone to the intercom line and hence to the calling party, a voice signal transmission circuit 13 is connected between the intercom line 7, and switching circuit 17, by voice signal path 14. Pickup keys contacts 15 are used to select a suitable line and thereby connect telephone network 16 through switch circuit 17. The function of switching circuit 17 is to switch the microphone 18 and speaker 21 between the voice path 14 and an outside line 5 or intercom line 7. Microphone 18 and speaker 21 both have their own amplifiers 19 and 20, respectively. TR relay 22 is operated via path 12 when an intercom call is received. A locking key contact 23, controls SP relay 24 which connects the microphone 18 and speaker 21 to the pickup keys. Its make-break contact is shown within switching circuit 17. SP relay 24 operates when key 23 is pushed and releases when key 23 is released. A pair of conductors 26 and 27 connect a telephone network 16 to the pickup key 15 when relay 24 is released; when relay 24 operates line 26 is disconnected from 27 and connected to the microphone amplifier 18 and speaker amplifier 19.

The operation of this apparatus for an intercom call is explained through FIG. 8. When an intercom call is made, telephone network 16 of the calling party is connected through the pair of conductors 27 to the switching circuit 17, through pair 26 to the pickup keys 15, and via line conductor 7 to intercom circuit 6. When the party finishes dialing, the output from register circuit 8 is connected through output tree circuit 9 and appears at the appropriate line 10, 11 or 12, driving relay TR of the telephone set called. TR relay 22 operates, energizing the microphone and speaker circuits via switch circuit 17 and simultaneously connecting them to conductor 14. By this connection the caller and the person called can converse through voice signal transmission circuit 13.

In the event the person called is using the handset, the pickup key for the appropriate intercom line could be pushed, telephone network 16 would be connected to conductor 7 and talking could be carried on between the two parties.

If a party wishes to talk on an outside (or intercom) line, using the microphone and speaker, key 23 is pushed, SP relay 24 operates, the pickup key of the outside (or inside) line is then pushed, the microphone and speaker circuit are thereby connected to conductor 5 (or 7) through pickup key contact 15, conductor 26 and switch circuit 17. The user can then talk on the outside (or inside) line without using the handset.

In FIG. 9 the major components are labelled with either letter or numeral designation, K1 and K2 are pickup keys, HS is a switch hook, *sp*, *tr* and *tb* are contacts for relays SP, TR, and TB, respectively and 101 is a voice switch circuit that controls the input of microphone amplifier 19, described above with reference to FIGS. 3–5. This switch is ordinarily in a partially conductive state. Coil 102 is a hybrid coil used to prevent electrical coupling from the microphone 18 to the speaker 21. A voice switch circuit 103 is used to control the input to speaker amplifier 20. A comparator 104 is used to compare the signal at the output from the microphone amplifier 19, rectified by diode D1, with the signal at the output from the hybrid coil 102, rectified by diode D2. When the signal from the microphone amplifier 19 is greater than the signal from the hybrid coil 102 then voice switch 103 becomes nonconductive and voice switch 101 simultaneously passes from partial conductivity to complete conductivity. Conversely, when the signal from the hybrid coil 102 is greater than the signal from the microphone amplifier 19, voice switch 101 becomes nonconductive while voice switch 103 simultaneously becomes conductive. This occurs because the output of voice switch 103 is connected through line 110 and diode D3 to amplifier 105. The output of amplifier 105 is connected through line 106*a* to the output of comparator 104, forcing voice switch 101 into the nonconductive condition when a signal, rectified by diode D3, appears at its input through lines 106 and 106*a*. Simultaneously it makes voice switch 103 conductive. TB relay 107 is operated by the operation of the SP relay contact SP3. Switch 108 is intended to release the TB relay 107 when the contact is opened through the nonlock type key 108.

To explain the operation of this circuit, if telephone set 2 receives an intercom call, TR relay 22 (FIG. 8) operates, and the voice signal is connected to hybrid coil 102 from line 14 by contacts *tr*1 and *tr*2, transformer T2 and contacts *tb*3 and *tb*4. The signal from the hybrid coil 102 is rectified by diode D2 and is applied as an input to comparator 104. The output of comparator 104 appears at 106. Because voice switch 103 is driven into conduction, the output of the hybrid coil 102 is connected to amplifier 20, with the voice signal of the caller coming out of the speaker 21. Meanwhile, the output at 106 switches voice switch 101 (which heretofore had been partially conducting) to a state of nonconductivity, thereby preventing feedback through the speaker and microphone. When the voice signal of the caller stops, no output appears at 106, voice switch 101 returns to normal, i.e., partial conduction, and voice switch 103 becomes nonconductive. At this point if the person receiving the call speaks into the microphone, his voice, amplified by amplifier 19, passes through hybrid coil 102, contacts *tb* 3 and *tb*4 and transformer T2 and is applied to line 14. The output from amplifier 19 is also rectified by diode D1 and applied as an input to comparator 104. The output of comparator 104 switches voice switch 101 to a completely conductive state and voice switch 103 is held in the non-conductive state. Because of the operation of voice switch 103 no sound is heard from the speaker 21, and consequently no feedback or howling occurs.

In the event the party wants to talk with the central office (CO) or the switchboard (PBX) line by means of the microphone and speaker, he operates the appropriate pickup key, for example, K1, and depresses key 23 (FIG. 8) operating SP relay 24 and TB relay 107 and connecting conductor 5 to the hybrid coil 102 through contacts K1, *sp*1 and *sp*2, transformer T1, contacts *tb*1, *tb*2, *tb*3 and *tb*4 (FIG. 9). The talking thereafter is the same as in the case of an intercom call described above.

Wiring option 109 can be connected as shown by the arrows, in FIG. 9 and if an intercom call is received while the telephone set is being used on an outside line, relay TR operates and the signal input from line 14 passes through contacts *tr*1, *tr*2, transformer T2 and contacts *tb*5 and *tb*6. The signal is fed to receiving amplifier 20 and speaker 21 via line 110 and also rectified by diode D3 and applied to amplifier 105. The output from amplifier 105 forces voice switch 101 into a completely nonconductive state, while voice switch 103 is made conductive. The telephone set is thus placed in a receiving condition so that the outside party cannot accidentally overhear the intercom caller's voice and the voices from both the outside line and the intercom line are heard from the speaker 21. Thereby the user knows that an intercom call is being received while privacy is also guaranteed. If the user desires to talk with the intercom caller momentarily, switch 108 is opened, TB relay 107 releases, and the external line remains connected to transformer T1. Because the secondary winding of T1 is bridged by resistance R1 at break contacts *tb*1 and *tb*2, the outside line during this interval is held and terminated by the proper impedance. On the other hand the input signal from 14, after passing through transformer T2 passes through contacts *tb*3 and *tb*4 and enters the hybrid coil 102, and the user can talk to the intercom caller only. When the user finishes his conversation and releases switch 108, relay TB again operates, the hybrid coil 102 is reconnected to transformer T1, and the user can again speak on the outside line.

Thus this circuit is one that simplifies the key manipulation of prior complicated key telephones sets and is of greater convenience because the microphone and speaker are furnished in the key telephone set, enabling the unit to be used as a speaker phone for outside and intercom calls without performing any additional operation. Intercom calls are automatically connected without any operation by the called party. Further, in the event an intercom call is received while a conversation is taking place on an outside line, using this apparatus the user is capable of talking with either caller privately and alternating easily between the two by simply operating and releasing a single non-locking switch.

Referring again to FIGS. 1 and 2, the remaining telephone set 100 apparatus illustrated in FIG. 2 is described more fully below in respect of the various operations of the key telephone system.

Turning briefly to FIG. 1, there is shown an operator-attended key telephone set 200, and a portion of the key service unit 300 incorporated in the key telephone system. It is to be noted that, if the line circuit 11 is contructed in accordance with the teachings of the patent application identified above, a connection thereto from an office line 15 can be made directly, when permitted by the telephone operating company, or through conventional station coupler (STC) or voice connecting (CD9) interface apparatus, without any requirement in respect of the last-mentioned interface for conventional interface adapters.

The key telephone system of FIGS. 1, 2 is now considered in terms of its operations.

III. Voice Communication on Office Line Connected to Key Telephone System

When the handset of key telephone set 100 is lifted, and the CO line key pressed, a circuit is established from the set's transmission network through hookswitch make contact HS, exclusion relay ("EX") break contact *ex* and line key make contacts COLK to the T and R leads, thence to the office line circuit 11. In accordance with the subject matter of copending patent application, Ser. No. 348,313, filed on Apr. 5, 1973, by Mikihiro Ichikawa and Kengo Sudoh entitled "AN AUTOMATIC EXCLUSION CIRCUIT FOR A KEY TELEPHONE SET," the exclusion circuit, including exclusion relay EX, functions to prevent unauthorized access from one key telephone set to a telephone conversation in progress on another. When the first key telephone set is placed off-hook, the exclusion circuit is grounded by the hookswitch make contact HS, which contact is connected, as shown in FIG. 2, to the H lead by the second COLK make contact through hold key break contact HK, and exclusion circuit.

A. Exclusion Circuit

Figure 10:
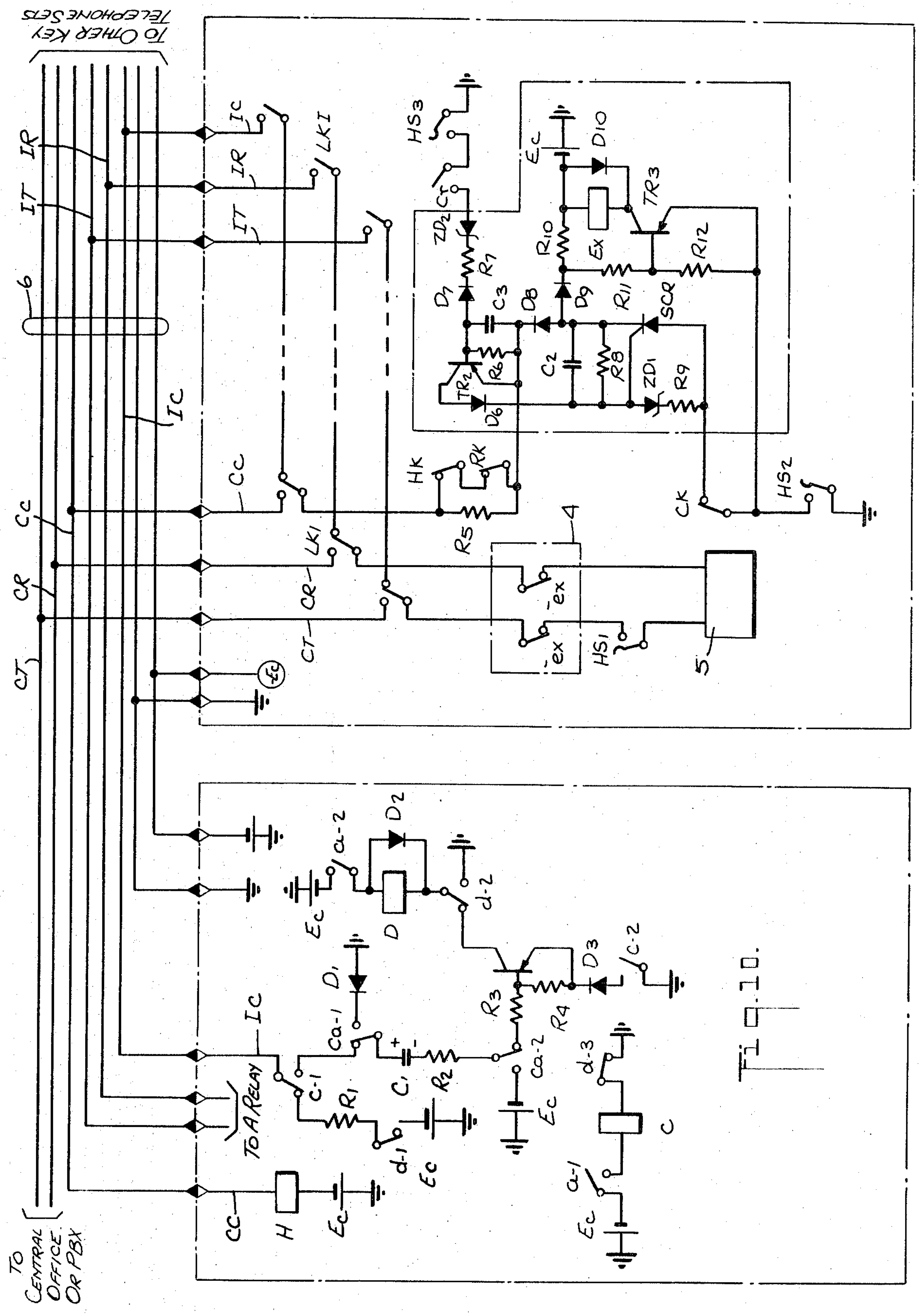
FIG. 10 depicts an automatic exclusion circuit for a key telephone set shown in FIG. 2.

More particularly, as shown in FIG. 10, a key service unit is contained within the broken line 1. The key service unit 1 is connected to each key telephone set (represented by the circuits within the broken line 2) by a central office line control lead CC. Additionally, each key set 2 is parallel connected to a central office, PBX, or other switching circuit (hereafter referred to as "central office circuit") by conventional tip and ring leads T and R. Similarly, each key telephone set 2 in the system is connected by the key service unit 1 by an intercom line control lead 1C, and intercom tip and ring leads IT and IR.

The coil of relay 11, connected between the negative side of a common power supply Ec and the central office control lead CC, when operated, performs supervisory functions for the associated central office line within the key system. It should be understood that the power sources shown herein as batteries are not to be construed as limiting the apparatus to operation with a battery, but other sources of power may equally as well be used.

The exclusion circuit is shown within broken line 3 with the contacts on exclusion relay EX within broken line 4. When exclusion relay EX is not operated, its two contacts *ex* connect a conventional telephone network 5, through hookswitch contact HS1 and the appropriately closed locking line key, LKC for a central office circuit, or LKI for an intercom line circuit. Cable 6 contains the tip and ring leads CT and CR for the central office line circuit, central office line control lead CC, key telephone system intercom tip and ring leads IT and IR and intercom line circuit control lead IC.

Relay A through its coil, (not shown) is used to feed the key telephone system power source Ec to the intercom line leads IT and IR. Relay C together with relay A, operate at the commencement of an intercom line call the former relay releasing when the answering relay, D, is operated by the intercom call being answered. Two or more key telephone sets 2 are parallel connected across intercom line leads IT, IT and IC. The contacts on relay C, A and D are shown in FIG. 10 as contacts *c*, *a* and *d* respectively.

Contacts *ca* on relay CA (not shown) are operated during the dial impulse counting of an intercom call origination. In their operated position, contacts *ca* connect the power source Ec through resistor R2 to capacitor C1, charging it as shown in FIG. 10 through diode D2 and ground. As explained infra, when during an intercom call, contacts *ca* return to the position shown in the drawing, capacitor C1 places positive voltage on intercom control line IC.

Relay CR (not shown), in the key telephone set 2 receiving an intercom call, operates, closing contact *cr*, when the called intercom signalling is commenced.

In FIG. 10, all relays, contacts, line keys and circuits appear in their idle condition prior to the initiation of any calls.

With respect to the transistor circuits, TR1 is used to drive relay D when an intercom call is answered. TR2, when turned on, provides gating current to silicon controlled rectifier SCR in the exclusion circuit 3 when an intercom call from another key telephone set is answered. Transistor TR3 drives the exclusion relay EX to open contacts *ex* and exclude the key telephone set 2 from connecting to either busy central office leads CT, CR or busy intercom leads IT, IR.

Zener diodes ZD2 and ZD1 are used to prevent false turn-on of the SCR when voltage drops in the key telephone system cables raise the voltage applied to the key telephone set 2 on leads CC and IC above their theoretical value.

HK is a contact on a non-locking hold key (not shown) for central office calls, RK is a contact on a non-locking exclusion defeating key (not shown). When either contact is operated, resistor R5 is placed in series with the central office control lead CC or the intercom control lead IC. CK is a contact which opens momentarily and then closes again whenever a line key is operated or released.

The functional operation of the exclusion circuit illustrated in FIG. 10 will now be explained for the various operations in a key telephone system.

When connection to a central office line circuit is required, and the office line connected by leads CT, CR and CC is not being used by any other key telephone set the party using key set 2 may, by pushing LKC and closing hookswitch contacts HS2, form a gate current path to SCR through R9, ZD1, and SCR, D8, contacts RK, HK, LKC, lead *cc*, and relay H to power source EC. Because the central office line is not already in use, the control lead CC is ungrounded and therefore, when this path is closed, the voltage across zener diode ZD1 exceeds its breakdown voltage causing current to flow through it and into the gate of SCR. This turns the SCR on, grounding lead CC and operating relay H. The operation of relay H performs conventional supervisory functions in the key service unit.

Further, by the conduction of the SCR and diode D9, and the closing of HS2, the emitter and base of transistor TR3 are grounded, preventing TR3 from conducting. Thus relay EX is not operated and contacts *ex* remain closed, connecting the conventional telephone network 5 in key telephone set 2, through closed hookswitch HS1 to the central office leads CT and CR.

If the central office line circuit is being used at the time that the LKC and HS2 contacts close, the central office control lead CC is grounded by the using key telephone set. Therefore, when the second key telephone set user pushes LKC and closes hookswitch contact HS2, ZD1, which is itself grounded, does not conduct because of the ground on lead CC, and no gate current flows through ZD1 and the SCR. Thus the SCR does not turn ON. Consequently, the base of transistor TR3 is not grounded by diode D9, transistor TR3 is turned ON by current through resistors R11, R11 and source Ec, collector current flows through relay EX, and relay EX operates, opening contacts *ex* and preventing the telephone network 5 from being connected across central office leads CT and CR. Thus by the operation of the exclusion circuit of this invention, a second key telephone set 2 is prevented from entering a central office line circuit in use by another key telephone set.

In the event the user of the central office line circuit wishes to permit a second key telephone set 2 to connect into the central office line circuit in use, because of the operation of the exclusion circuit, the party using the central office line has exclusive control over this operation. Even if the line key contacts LKC and the hookswitch contacts HS2 are closed, the second set will not be connected to the line because the EX relay in the second key set will operate, its *ex* contacts opening and preventing the connection of telephone network 5 in the second key telephone set to leads CT and CR.

If, however, the user of the central office line circuit pushes his exclusion circuit defeat or release key, opening contact RK, resistor R5 is placed in series with central office control lead CC. This removes the direct ground on lead CC, dividing the voltage of EC between the coil resistance of relay H and resistor R5. At this point, the user of the second key telephone set 2, who wishes to join the central office line circuit may, by closing the appropriate line key contacts LKC and closing hookswitch contact HS2, connect to the line because the voltage on lead CC is sufficient to break down ZD1 and turn on the SCR in this second key telephone set in the same manner as would occur in connecting to an idle line.

This occurs because line CC was permitted to reach a negative voltage by the addition of resistor R5 in series with relay coil H when contact RK was opened in the first key telephone. During this sequence, the SCR in the first key telephone is not affected by the voltage variations in the circuit because a path for the SCR current is formed through diode D9 and resistor R10 to power source Ec.

To make a call on an idle intercom line, the circuit functions as follows:

When the line key is pressed, closing LKI, and the hookswitch contacts HS1 and HS2 are closed, because the intercom control lead IC is not grounded by another key telephone set, gate current flows through the SCR of the key telephone set via the path R9, ZD1, SCR, D8, RK, HK, LKI, line IC, contact *c*-1 break, R1, contact *d*-1 and the negative terminal of power source Ec. This turns the SCR, ON, grounding the base of transistor TR3 through D9 and turning TR3 OFF. As previously described, relay EX does not operate, contacts *ex* remain closed, and the telephone network 5 is connected to intercom leads IT and IR. The SCR grounds resistor R1, excluding all other sets. At this point, relay A operates and its contact *a*-1 is closed. This operates relay C through the circuit L ground, contact *d*-3, relay coil C, contact *a*-1, and power supply Ec. With relay C operated, contact *c*-1 in the IC lead circuit opens the current path of the SCR through R1 in the key service unit 1. However, because of the alternate current path through diode D9 and resistor R10 to power supply Ec, the SCR in the key telephone set if held ON, transistor TR3, is held OFF and relay EX is not operated, permitting the telephone network 5 to continue its connection to leads IT and IR making an intercom call possible. Meanwhile, since there is no negative potential connected to lead IC, other sets are still excluded from the line.

At this point, as the key telephone user dials to signal another key telephone, relay CA operates and its contacts *ca*-1 and *ca*-2 connect power source Ec and ground through R2 and diode D1 to capacitor C1, charging it.

Because there is no discharge path for C1, it holds the charge when relay CA is released after dialing is completed. At this point relay CR of the called telephone set operates, closing contact *cr* in the called key telephone set. Further, when the person answers, raising the receiver, hookswitch contacts HS1 and HS2 close. By depressing his line key, contacts LKI are closed. Capacitor C1 then discharges through the path formed by the circuit: contact *c*-2 (relay C having operated at the beginning of the call), diode D3, the emitter-base junction of TR1, R3, contact *ca*-2 break, R2, C1, contact *ca*-1 break, contact *c*-1 make, lead IC, LKI contact, contacts HK and RK, the emitter-base junction of TR2, diode D7, R7, Zener diode ZD1, contacts *cr* and HS3, and ground. The discharge current from C1 also flows in the emitter-collector circuit of TR2, through diode D6, SCR, D9, R10 and the battery Ec. This current gates SCR, turning it ON, the SCR cathode current flowing through diode D9, resistor R10 and power supply Ec. Transistor TR3 in the called key telephone is thereby turned OFF. Relay EX does not operate, and the telephone network 5 is connected to intercom lines IT and IR permitting conversation between both parties bridged across IT and IR. At the same time, the discharge of C1 turns transistor TR1 on, operating relay D. The operation of relay D, through its contact *d*-3, releases relay C to produce an answer condition in the intercom line circuit. Contact *d*-1 keeps the IC lead circuit open after relay C releases so that there is no voltage to permit connection of another key telephone set. In this way an intercom line circuit is formed, and it is possible to have an exclusive intercom conversation between the two parties. Even if another key telephone user presses LKI, and closes hookswitch contacts HS1, HS2 and HS3, as explained above, no gate current will flow to the SCR in the key telephone set, the SCR cannot be turned ON, therefore permitting transistor TR3 to continue in the ON condition, operating relay EX, and disconnecting the telephone network 5 from the intercom leads IT and IR. Thus the exclusion condition is maintained.

As explained in detail above, it is possible in a key telephone system by the exclusion circuit shown in FIG. 10, to have the capability of automatically excluding from both a central office line circuit and an intercom line circuit additional users who might attempt to connect to an existing conversation, while permitting momentary release of the circuit at the under control of the first telephone user to connect to the line while in an idle state.

Returning again to FIG. 1, in the line circuit 11, described more fully below with reference to FIGS. 11–14, is a relay with its coil connected between the H lead and the negative terminal of a positive ground 24 volt DC supply. The negative potential appears at the exclusion circuit, via the H lead, the second COLK make contact and hold key break contact HK. In response to this negative voltage, the exclusion circuit extends ground from the hookswitch contact to the H lead, operating the relay in the office line circuit 11. The operation of the line circuit 11 relay grounds the L lead, lighting the lamps COLL at all key telephone set stations, including operator-attended station 200, to indicate that the CO line corresponding to said lamp is busy. In particular, current flows from the ground at the line circuit 11, via the L lead, through the corresponding lamps at all stations, to the lamp power source LB. If the key telephone system is directly connected to the office line, current flows from the central office or PBX over the tip conductor, through the transmission network as described above, and back to the central office or PBX over the ring conductor. Upon receipt of dial tone, a telephone call may be placed from key telephone set 100.

B. Universal Line Circuit in Key Service Unit

Figure 14:
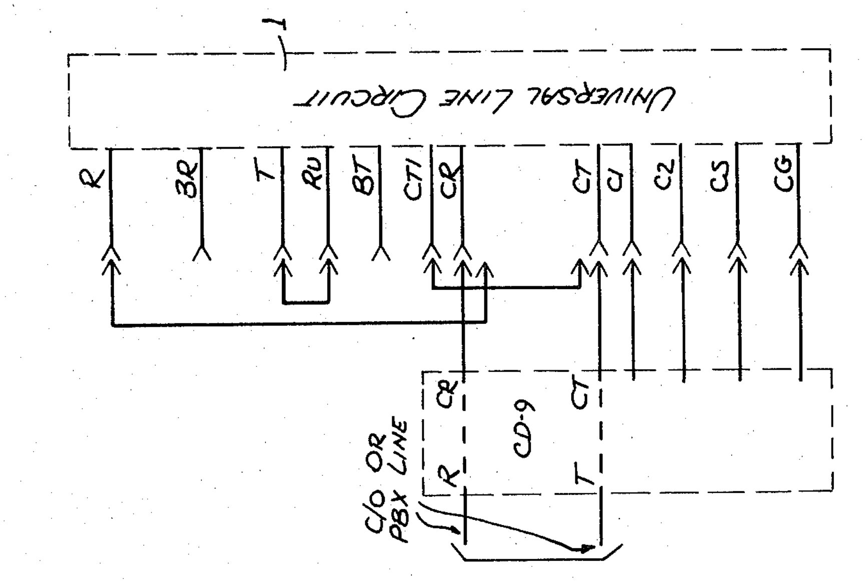
FIG. 14 is an electrical schematic and block diagram illustrating the electrical connections to the line circuit of FIG. 11, when that line circuit is connected to a central office of PBX line through conventional voice connecting (CD-9) interface equipment.
Figure 12:
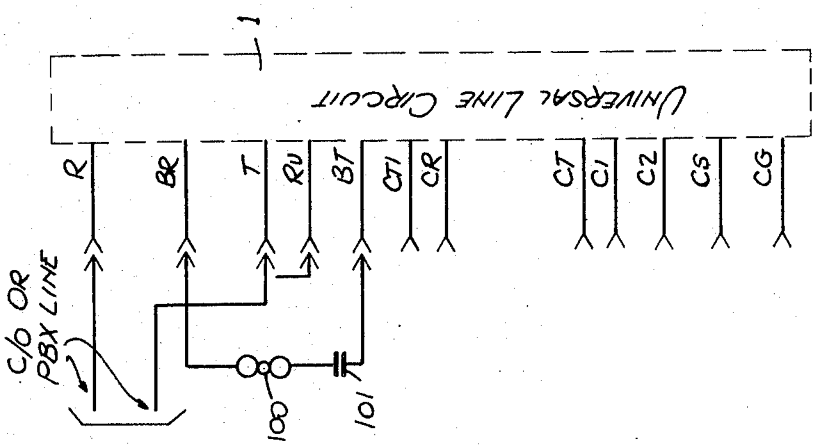
FIG. 12 is an electrical schematic and block diagram illustrating the necessary electrical connections to the line circuit of FIG. 11, when that line circuit is directly connected to a central office or PBX line.

Referring now to FIGS. 11–14; the universal line circuit there shown for use in a key telephone system can be directly connected to a central office or PBX line, as shown in FIG. 12, or to such line through conventional station coupler (STC) apparatus (FIG. 13), or to conventional voice connecting (for example CD-9) apparatus (FIG. 14). Furthermore, the connections shown in FIG. 14 do not require the use of conventional adapters between the interface apparatus and the line circuit.

In addition, the universal line circuit described in FIGS. 11–14 is arranged to couple music, or any other suitable program material, to a held call, thereby assuring the held party that he is still connected to the key telephone system. In this regard, it should be noted that the holding function of the instant line circuit are performed the same way whether the holding party originated, or received the call.

Before turning to a detailed description of the preferred embodiments of this invention, the following should be noted with reference to FIG. 11. First, all the pertinent input and output leads of the universal line circuit 1 have letter identification designation. Where appropriate, the letters selected are conventionally used to identify speech paths (for example, T, R) and signalling paths (for example,L) in telephone systems. Second, for convenience of explanation, various windings on the same relay, for example, relay RA, are shown at their electrical location in the universal line circuit 1; their physical location is, of course, on the same relay core. Third, the other conventional schematic notations of detached-contact electrical schematic drawings have been used in the drawings. Fourth, those of skill in the art to which the present invention relates know the construction and operation of conventional interface equipment, such as station coupler (STC) apparatus, and voice connection (CD-9) apparatus. Accordingly, no detailed description thereof is presented.

Referring now to FIGS. 11, 12, the central office or PBX line T and R leads are directly connected to a pair of line conductors, the T and R leads of the univeral subscriber's line circuit 1 (hereinafter universal line ciruict). The T and R leads of the universal line circuit 1 are wired or cabled to one side of the normally open or make contacts 12 of a mechanically locking line key (not shown); these key contacts are also wired through a normally open or make hookswitch contact 13 to the transmission network 8 of a key telephone set 2. The H lead of the universal line ciruict 1 is connected to one side of the third normally open line key control 12, the other side of which is connected through normally closed hold key contact 14, and shunt resistor R19, thence to normally open hookswitch contact 13 and ground. The operation of the hold key (not shown) opens hold key contact 14. Releasing the hold key, releases the locked line key, and closes contact 14.

As shown in FIG. 11, the T, R, H, L, LB and AS leads of universal line circuit 1 are wired in parallel to the corresponding leads of all other key telephone sets 2 (not shown) in the system. It is of course understood by those of skill in the art, that the key service unit in a key telephone system incorporates as many universal line circuits 1 as there are central office or PBX lines connected to the system, and the key telephone sets, as many keys. Moreover, the key service unit incorporates additional apparatus, for example, interrupters 4, 5, 6, program or signal source 3, and d-c power supplies 9, 10, 11.

In the quiescent or idle state of the universal line circuit 1, the transistors Q1, Q2, and Q3 are nonconducting. A first relay means T has two windings 22, 23 for hold control and power interruption monitoring functions; the turns ratio of windings 22, 23 is 1:1. Relay means T is normally operated throught the connection of winding 22 to external power source 11 and ground potential, via a circuit path including break contact h5 of a second relay means H, diode D13 and resistor R17. However, both relay means H whose windings 16, 17, 18 are for line holding (and held call abandonment), hold signal induction and answering supervision functions respectively, and a third relay means RA, which provides the primary control of the CS, CG answer-monitor leads in a connection to CD9 interface apparatus (FIG. 4), and whose windings 19, 20, 21 are for talking current supply (windings 19, 20) and incoming call indication functions (winding 21), are normally released. Make relay contacts *ra*-1 and *h*-3 are used to control dial pulsing and supervision from the key telephone set 2 to the CD-9 interface apparatus, over the CS and CG leads.

a. Incoming Call Indications (FIGS. 11,12)

Referring to FIGS. 11,12, when an incoming call is completed at the central office or PBX to the key telephone system, a-c ringing current from the central office or PBX appears between ground and lead T or lead R. Superimposed d-c which may also by present is blocked from universal line circuit 1 by capacitor C1 or capacitor C2. When the instantaneous negative voltage with respect to ground at the anode of zener diode D6 exceeds the sum of the breakdown voltage thereof, and the forward conduction voltage of the base-emitter junction of transistor Q1, current flows from ground through that base-emitter junction via resistors R7 and R5, diode D6, resistor R1 and capacitor C1 via the RU lead, which is strapped to the T lead (FIG. 12), or through resistor R2 and capacitor C2 to the R lead, then through the central office or PBX ringing generator to ground.

Due to the conduction of transistor Q1 during the negative half cycles of ringing voltage, current flows from ground through the collector of transistor Q1 via resistors R8, R9 and R10, and the base-emitter junction of transistor Q2 to the power source 11. Transistor Q2 then conducts from collector to emitter causing transistor Q3 to conduct from ground, via its base-emitter junction, zener diode D7, resistor R13, and the collector-emitter circuit of transistor Q2 through the power source 11 to ground. The conduction of transistor Q3 supplies operating current to winding 21 of relay RA by the circuit comprising ground, the emitter-collector circuit of transistor Q3, winding 21, break contact *h*-4 and the power source 11.

Relay RA then operates closing a circuit from ground via break contact *h*-5, diode D15, and make contact *ra*-3, to the interrupter 6 of conventional construction, which is driven in parallel with another conventional interrupter 4. Consequently, interrupted current flows from power source 9 via interrupter 4, make contact *ra*-4, break contact *h*-6 and leads L to each key telephone set lamp 15 corresponding to line circuit 1, then returns to power source 9 on the LB lead from the key telephone sets 2. The lamps 15 flash, and an audible signal is sounded at buzzer 7 over the AS lead by interrupter 6. The key telephone set users are thereby informed that an incoming call has arrived at the universal line circuit 1.

As precautionary measures with respect to the operation of line circuit 1 in response to ringing current, diode D5 prevents an inverse voltage, for example, the instantaneous positive ringing voltage with respect to ground, from being applied across the base-emitter junction of transistor Q1. Capacitor C3 prevents false conduction of transistor Q1 resulting from a-c voltages, other than a-c ringing voltage from the central office or PBX, by presenting a high impedance to low frequency a-c ringing voltage, and a low impedance to high frequency noise voltage disturbances, shunting the latter to ground. Zener diode D6 also prevents false conduction of transistor Q1 in response to dial pulses or other transient high voltage conditions, which may appear on the line from the central office or PBX while the universal line circuit 1 is in the idle condition.

Moreover, when transistor Q1 initially conducts, as described above, a portion of the collector current from transistor Q1 charges capacitor C4 via resistors R8 and R9, whose charging time constant is established so that the bias voltage across the base-emitter junction of transistor Q2 increases gradually, during the first several cycles of the a-c ringing waveform, as capacitor C4 charges. This gradual charging delays the conduction of transistor Q2 with respect to transistor Q1, so that even if transistor Q1 should conduct falsely for a short time, transistor Q2 does not conduct. However, once transistor Q2 passes current from collector to emitter, transistor Q3 conducts, and relay means RA operates. At that time, make contact *ra*-2 short circuits resistor R8. and capacitor C4 is able to charge to full capacity more quickly.

During the periodic intervals when no a-c ringing current is supplied from the central office or PBX to the universal line circuit, transistor Q1 does not conduct. However, during these time intervals, the discharge current from the capacitor C4 flows via resistor R10 through the base-emitter junction of transistor Q2. Therefore, transistors Q2 and Q3 maintain a state of conduction during these time intervals, and relay RA remains operated, and continues to drive interrupters 4,6. Thus, the visual and audible indications of incoming calls at the key telephone sets connected to the universal line circuit 1 are not affected by the periodic interruption of the a-c ringing current from the central office or PBX.

However, whenever the a-c ringing voltage is discontinued, the voltage across capacitor C4 gradually diminishes due to the discharge from this capacitor through the base-emitter junction of transistor Q2. If, for example, due to the abandonment of the call at the originating end, the ringing voltage is not reapplied on the T or R leads for a prolonged period, the voltage across capacitor C4, and hence the base-emitter current of transistor Q2 ultimately becomes insufficient to maintain conduction of transistor Q2. Consequently, transistor Q3 also becomes non-conductive, relay means RA releases, and the signals to lamps 15 and buzzers 7 are cut-off; this sequence is conventionally known as "time out."

Furthermore, when an incoming call from the central office or PBX is received while the universal line circuit 1 is out of service due to failure of the external power supply 11, an audible indication of the presence of an incoming call is produced as follows. Whenever power source 11 fails, normally operated relay T releases. The central office or PBX a-c ringing current then flows in the circuit including lead R, break contacts *t*-1 and *h*-1, lead BR, conventional ringer 100 (FIG. 12), capacitor 101, lead BT, break contacts *t*-3 and *h*-2, lead RU and lead T which is strapped thereto, thereby operating ringer 100.

b. Incoming Call Indication (FIGS. 11, 13)

When the connection between the universal line circuit 1 and the central office or PBX line is made through conventional STC interface equipment, the electrical interconnections are as shown in FIG. 13. The a-c ringing signal from the STC apparatus appears between its RU1 and CR leads, and is coupled internally from its CR lead to ground by other circuits within the STC apparatus, thereby appearing between ground and lead RU of the universal line circuit. The consequent operation of transistors Q1, Q2, Q3 and relay means RA is identical to the case of the direct connection with a central office or PBX line as described in detail above. Lamps 15 and buzzers 7 of the key telephone sets operate in the manner described to provide visual and audible indications of the arrival of an incoming call.

c. Incoming Call Indication (FIGS. 11, 14)

When the connection between the universal line circuit 1 and the central office or PBX line is made through conventional CD9 interface equipment, the electrical interconnections are as shown in FIG. 14. When the CS9 apparatus receives an incoming call from a central office or a PBX line, a short circuit is presented across leads C1 and C2 and in the CD9 apparatus. Consequently, steady current flows through the base-emitter junction of transistor Q1, through the circuit consisting of ground, the base-emitter juction of transistor Q1, resistors R7, R5 and R3, the C1 lead, the CD9 apparatus contacts (not shown), the C2 lead, resistor R4 and power source 11; transistor Q1 then conducts.

The operation of the universal line circuit 1 after transistor Q1 conducts is identical to the case of the direct connection to the central office or PBX line as described in detail above. Transistors Q2, Q3 and relay means RA operate, and visible and audible signals are produced at the key telephone sets in the manner set forth above.

d. Incoming Call Answering (FIGS. 11, 12, 13)

The manner in which the universal line circuit 1 operates when an incoming call on a central office or PBX line is answered, is the same for a direct connection to the office line (FIG. 12), or for a connection to the office line through STC (FIG. 12), or for a connection to the office line through STC interface equipment (FIG. 13).

In either case, when a key telephone set user recognizes the arrival of an incoming call, lifts the handset and operates the appropriate line key, the key telephone set's transmission network 8 is connected to leads T and R via hookswitch make contact 13 and line key make contacts 12. A d-c loop and talking path are then formed across leads T and R and d-c current flows from the central office, PBX or STC interface apparatus via network 8. At the same time, control lead H is grounded by a connection from ground through hookswitch make contact 13 via hold key (not shown) break contact 14, and the line key make contact 12.

Relay means RA was already operated by the conduction of transistor Q3, as described in detail above, but ground on the H lead, via diode D9 to the anode of zener diode D7, cuts off transistor Q3. Current simultaneously flows over the control lead H through the H relay means winding 18 via diode D10, and parallel T relay means winding 22 via diode D11. Relay means RA then releases, relay means H operates and capacitor C4 is discharged through resistor R12 by make contact *h*-4.

The operation or relay H cuts off the current supplied via break contact *h*-5 to T relay winding 22, but current supplied to winding 22 of relay T from lead H via diode D11 holds relay T operated. Due to the combined operation of relay means H and T, the circuit to interrupters 4,6 is cut-off, and lead L is directly connected from lamps 15 to the lamp lighting power source 9 via make contacts *h*-6 and *t*-5, so that all lamps 15 light steadily, indicating to the users of other key telephone sets in the system that the associated universal line circuit 1 is busy.

d. Incoming Call Answering (FIGS. 11, 14)

When an incoming call arrives at a universal line circuit 1, connected to a central office or PBX line through CD-9 interface equipment as shown in FIG. 14, and the key telephone set 2 handset is lifted, and the appropriate line key thereof operated, as described in detail above, relay means T stays operated, relay means RA releases, relay means H operates, and then lamps 15 light steadily as described above.

However, in this arrangement, transmitter current is supplied to the transmission network 8 by the circuit comprising power source 10, RA relay winding 20, lead CT, which is strapped to lead CT1, make contact *h*-2, lead RU, which is strapped to lead T, line key contact 12, hookswitch contact 13, through the transmission network 8, line key contact 12, lead R, which is strapped to lead CR, and relay RA winding 19, thereby reoperating relay RA.

As shown in FIG. 14, the CR and CT leads of the universal line circuit 1 are connected with the CR and CT leads of the CD-9 apparatus, and are in turn transformer coupled to the T and R leads of the central office or PBX line, thereby establishing a talking path between the key telephone set 2 and the calling party through CD9 apparatus.

Moreover, the answer-monitor circuit (not shown) between CS and CG leads of the CD9 apparatus, is shorted by make contacts *h*-3 and *ra*-1, thereby indicating to the central office or PBX that the called station has answered.

f. Call Holding (FIGS. 11, 12, 13)

The manner in which the universal line circuit 1 operates when either an incoming or outgoing call is placed on hold, is the same for a direct connection of the line circuit to the central office or PBX line (FIG. 12) or for a connection to the central office or PBX line through STC interface apparatus (FIG. 13).

The call is held by momentarily operating the hold key (not shown) provided in the key telephone set 2, thereby opening hold key contact 14 and removing the short circuit from resistor R19. When contact 14 opens, the voltage on lead H at the anode of diode D11 is determined by the voltage dividing circuit between the power source 11 and ground, comprising winding 18 of relay means H and resistor 19. However, the voltage at the cathode of diode D11, which is hereinbelow shown to be positive with respect to the anode, is determined by the voltage dividing circuit, comprising the resistances of windings 22 and 23 of the relay means T, these windings connected between the power source 11 and ground by make contact *h*-5 and diode D12. The resistance values of windings 18, 22 and 23 and resistor R19 are chosen so that diode D11 becomes reversed biased when the telephone set hold key is operated. When diode D11 is reversed biased, the same current flows in winding 22 and 23. The magnetic fluxes developed by windings 22, 23 are equal, because as noted above the turns ratio is 1:1. Moreover, winding 22 and winding 23 are connected so that in this condition their magnetic fluxes are mutually opposing, hence relay means T releases.

When the key telephone set user then releases the hold key, the locked line key associated with the universal line circuit 1 automatically releases, and leads T, R and H of the universal line circuit 1 are opened at the key telephone set by the opening of line key make contacts 12. However, H relay means winding 16 has been bridged by the release of relay T across leads T and R of the universal line circuit 1 via the circuit comprising lead R, break contact *t*-1, make contact *h*-1, diodes D1 and D3, H relay winding 16, diodes D4 and D2 respectively, break contact *t*-2 and lead T. Therefore, the d-c loop across the T and R leads is maintained by the coil 16 of relay means H, the current through which holds relay means H operated.

As a result of the maintained operation of relay H, and the release of relay T, interrupter 5 is started by the connection of ground via the circuit comprising make contact *h*-5, diode D14 and break contact *t*-4. Current interrupted in a different period from that of interrupter 4, thereafter flows in leads L from power source 9, via interrupter circuit means 5, break contact *t*-5, and make contact *h*-6. Lamps 15 at all stations flash at a rate different from the rate for incoming call indication, thereby indicating to the key telephone set users that a call is on hold.

While the incoming call is on hold, a signal, for example, music or other program material, is induced into H relay means winding 16 from H relay means winding 17, which is connected to a conventional program or signal source 3 through resistor R18. This induced signal is sent across leads T and R through the central office or PBX to the held party as an indication that his call is on hold. At this time, as noted above, lead H is in an open state because of the opening of line key contact 12. To prevent the induction of noise voltages capacitively coupled into lead H from H relay means winding 18 to H relay means winding 16, a bypass capacitor C5 is connected between the H lead and the power source 11. Moreover, since the diode D10 is not forward biased, it presents a high impedance to the passage of such noise signals through winding 18, thus completely suppressing them.

g. Call Holding (FIGS. 11, 14)

When the universal line circuit 1 is connected through CD9 interface apparatus to the central office or PBX line, universal line circuit leads T and R, as described in detail above, are connected via windings 19 and 20 of relay means RA to power source 10, so that relay means H (winding 16) and relay means RA are held operated by the current supplied thereby from power source 10. Consequently, there is a short circuit between lead CS and lead CG during hold, because of make contacts *h*-3 and *ra*-1.

Furthermore, capacitor C7, which is connected to the relay means T winding 23 and the cathode of diode D12, assures that, even if the automatic release of the line key, which follows the release of the hold key, is slow, and lead H is momentarily grounded via line key contact 12, hold key contact 14 and hookswitch contact 13, the discharge of current from capacitor C7 through relay T winding 23 delays the operation of relay T, thereby causing the on-hold condition described above in detail to be maintained.

h. Call Answering After Holding

When the key telephone set user lifts the handset of his key telephone set, and operated the line key associated with the held universal line circuit 1, the transmission network 8 of his key telephone set, in entirely the same manner as described in detail above, is connected to leads T and R. At the same time, lead H is again grounded, and relay means T reoperates.

The H relay means winding 16 is then disconnected from leads T and R by break contacts *t*-1 and *t*-2, removing the holding bridge from across the line. Since relay means H is already grounded at winding 18 by lead H, it remains operated. The party at the key telephone set may now talk to the other party directly over the T and R leads when permitted (FIG. 12), or through conventional interface apparatus (FIG. 13,14) connected to those leads.

It should be noted with reference to the call-on-hold condition described above, that when current flow through the T and R leads is interrupted by the central office or PBX, for example, in response to the outside party's abandonment of the call, relay means H releases, since no current is supplied to windings 16 or 18. Furthermore, since relay means H normally self-holds via its make contact *h*-1, relay means H cannot reoperate once it is released, even if a voltage is reapplied across leads T and R from the central office or PBX. Accordingly, in this situation, the universal line circuit 1, and consequently the office line itself, are released from the hold condition and both are restored to the idle condition.

i. Call Completion

When the conversation is completed, and the handset is replaced on the hookswitch of key telephone set 2, or the line key is released, the d-c loop across leads T and R is opened. Since the H lead ground is also removed at this time, all relay means in the line circuit 1, except relay means T, release. Capacitor C6 discharges into T relay means winding 22, and thereby prevents the T relay means from releasing while the H relay means releases and its contacts *h*-5 make and break. Lead L is disconnected from power source 9, and lamps 15 extinguish, indicating that the line circuit 1 is in the idle condition.

j. Outgoing Call

Whenever the universal line circuit 1 is in its idle condition, any key telephone set user in the key telephone system may seize the line for making an outgoing call through the central office or PBX, by lifting his handset and operating the appropriate line key.

Line key contacts 12 connect the transmission network 8 through hookswitch contact 13 across the T and R leads, and place ground from hookswitch contact 13, through holdkey 14, on the H relay means winding 18, and via diode D11 through the T relay means winding 22 to power source 11. Relay means H consequently operates, opening the holding path through diode D13 and resistor R17 to the T relay means winding 22, which, however, is held over the H lead as described. Make contacts *t*-5 and *h*-6 complete a circuit from power source 9 to lamps 15, over the L lead, lighting lamps 15 at all key telephone sets to indicate that associated line circuit 1 is in use.

When the line circuit 1 is connected directly to the office line, or through an STC interface, upon operation of line key contacts 12, d-c transmitter current flows in the T and R leads through network 8, seizing the office line, in response to which the central office or PBX connects dial tone, which is transmitted over the T and R leads to the network 8.

When the line circuit is connected to the central office or PBX line through a CD-9 interface, the leads are strapped as shown in FIG. 14. Operation of the H relay means closes a circuit at make contact *h*-2, so that transmitter current flows from the power source 10 via RA relay means winding 20, the CT and CT1 leads which are strapped, make contact *h*-2, the RU and T leads which are strapped, to the transmission network 8 via line key contact 12 and the hookswitch contact 13, and from the network 8 via line key contact 12, the R lead which is strapped to the CR lead, and RA relay means winding 19 to power source 10. This current operates relay means RA.

The operated relay means H and RA place a short circuit across the CS and CG leads at make contacts *h*-3 and *ra*-1, seizing the CD9 interface apparatus, which repeats the seizure to the central office or PBX. The central office or PBX returns dial tone, which is coupled via the CT and CR leads to the T and R leads, and hence to the transmission network 8.

When the universal line circuit 1 is connected to the central office or PBX directly, or via the STC interface, dial pulses from the key telephone set dial contacts (not shown) incorporated in the network 8, are transmitted directly to the central office or PBX, in the conventional manner, or are repeated by the STC interface from the STC interface leads CT and CR to the central office or PBX line.

When the universal line circuit 1 is connected via a CD-9 interface, relay RA in the universal line circuit 1 pulses in response to the interruption of the current through it by the key telephone set dial (not shown). These impulses are repeated by make contact *ra*-1 across the CS and CG leads, and thence repeated to the central office or PBX by the CD9 interface.

Moreover, as is explained above, and illustrated in Table I below, the various line circuit functions are performed under the control of only three relays, which operate and/or release in various combinations to establish the proper interconnections between the key telephone system and central office of PBX line. For example, relay means RA operates to provide incoming call indications to the key telephone sets, and in a connection to an office line through CD9 interface apparatus, in combination with the H relay means, transmits dial pulses to the central office or PBX, maintains a talking path therebetween, and couples d-c battery to the transmission network 8. Other subscriber line circuit functions, for example, line holding, music-on-hold coupling, held call abandonment supervision and answering supervision are performed by the H and T relay means, either alone or in combination with each other.

The various states taken by respective relay means T, H and Ra, and the universal line circuit status which thereby obtains, are shown in Table I. As used therein, "off" means the relay is released, and "on" means the relay is operated.

TABLE I

| RELAY STATE T | H | RA | LINE CIRCUIT STATUS |
|---|---|---|---|
| ON | OFF | OFF | Idle. |
| ON | OFF | ON | Incoming call indication. |
| ON | ON | OFF | (a) Non-CD9 call answering.<br>(b) CD9 outgoing call.* |
| ON | ON | ON | CD9 call answering. |
| OFF | ON | OFF | Non-CD9 hold. |
| OFF | ON | ON | CD9 hold. |
| OFF | OFF | OFF | Key service unit power failure. |

* Relay RA alternates between states

Moreover, the universal line circuit described herein offers additional advantages over prior art subscriber's line circuits. For example, program material or music-on-hold can be inexpensively transmitted to a held party by utilizing the transformer action of an additional winding on relay means H, which also establishes the appropriate line circuit connections for holding an incoming call, and supervises the abandonment of a held call.

IV. Voice Communication on Intercom Line in Key Telephone System

Returning to consideration of the over-all operation of the key telephone system of the present invention, in the same manner as described above with reference to the central office line key (FIG. 2), operation of the intercom line key, ICMLK, connects the transmission network of the key telephone set 100 (FIG. 2) to the T and R conductors of the intercom line circuit 16 (FIG. 1).

As shown in FIG. 1, there is a dual winding relay A within the intercom line circuit 16. The first winding is connected between the −24 volt supply and the R conductor; the second winding is connected from ground to the T conductor; the windings are so arranged that the fields created in the relay core by the two windings are mutually aiding when a DC path is established across the T and R leads. Thus, operation of the intercom line key ICMLK causes operation of the relay A in the intercom line circuit. The operation of the A relay causes the L relay in the intercom line circuit 16 to operate, establishing two paths to the register circuit 17 at the two "L" make contacts in the circuit 16.

While conventional register circuit apparatus can be used in the key telephone system here described, it is preferred to use the register circuit described in copending application Ser. No. 344,199, filed on Mar. 23, 1973 by Kengo Sudoh and Fumio Tsutsumi, entitled "A RELAY TELEPHONE DIAL PULSE REGISTER."

A. Register Circuit

Figure 15:
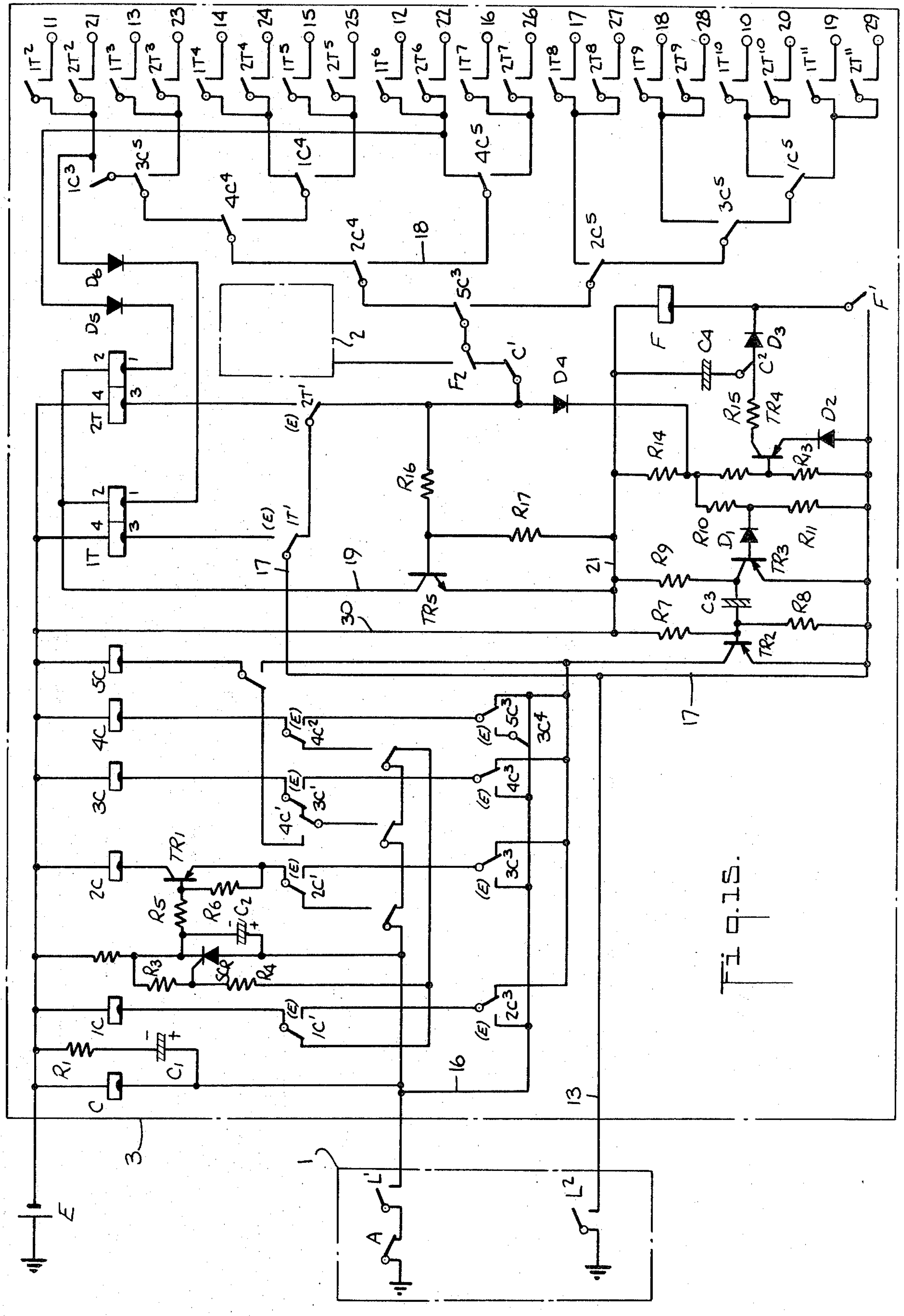
FIG. 15 illustrates in schematic form a relay telephone dial pulse register.

Referring to FIG. 15, which depicts in schematic form, a relay telephone dial pulse register circuit, one of one or more intercom line circuits 1 is connected in parallel to the dial pulse register circuit 3.

In the drawing, the contacts on the relays are shown in their unoperated positions. When the relays operate, their contacts close to the position opposite that shown in the drawing. The letter "E" in parentheses (E) beside some of the make contacts denotes a make-before-break or early make contact, while beside a break contact it denotes a break-before-make or early break contact.

Talking relay A (not shown in the drawing) is connected to the intercom register circuit 3 through its contact A and is controlled by a key telephone set (not shown in the drawing) connected to intercom circuit 1. When the hook switch and corresponding line key switch of the key telephone set are closed, relay A operates, and if no other relays L (not shown), in the other line circuits (not shown), are operated, relay L (not shown) in the line circuit shown operates closing contacts $L^1$ and $L^2$. When the dial is operated at the key telephone set, it generates dial impulses. The dial impulses pulse relay A. Relay L is held operated while the dial impulses are repeated by relay A. 1C and 5C are counter relays in the register circuit. Each relay contact is labelled sequentially $1C^1$, $1C^2$, $1C^3$, etc., with the number before the letter corresponding to the particular counting relay and the number following the letter designating the number 1 contact, number 2 contact, etc., for relay 1C. This numbering convention applies to all the relays 1C through 5C as well as relays 1T and 2T. Relay C, a "C position relay" operates, and is held operated, when the first dial impulse is applied as an input to the register circuit by contact A. The relay C releases in response to a minimum, predetermined interdigital pause in the dial impulses at the end of the impulse train. In FIG. 15, C, without a prefaced number, designates its contact. Relays 1T and 2T, having contacts, 1T and 2T, are used to store the first digit of the two digit number dialed. Relay F, having contacts F, operates when the dialing is completed. The output terminals on the drawing, labelled 11, 21, etc. down through 19 and 29, are the register output terminals corresponding to the dial numbers of the key telephone connected to the register. When the counting in the register is completed, the register connects the called telephone through the appropriate register output terminal to the signal source circuit 2. The details of circuit 2 are omitted because they are irrelevant to an understanding of the register circuit of FIG. 15.

To explain the operation of the register circuit, the sequence of events within the circuit will be traced, assuming one key telephone user wishes to reach the key telephone set connected to terminal No. 20 by dialing that number. The calling party, by raising his handset, closes the hookswitch, operating relay A which, in turn, operates relay L. By the operation of relay L, a path is prepared to the register circuit through contacts $L^1$ and $L^2$ and leads 12 and 13. The preparation for the counting of the dial impulses is thus completed. When the calling party dials the first digit, 2, dial impulses are applied as inputs to the register circuit through contact A, (the contact on relay A) and the register counts the impulses. In this case, relay A releases twice thereby applying two ground pulses to lead 12.

As a result of the first release of relay A, closing contact A, ground is applied to both relays C and 1C. To relay C, current passes through contacts A and $L^1$ to lead 12, through the relay C winding on lead 14, and to the negative terminal of power source E. (The power sources are represented in FIG. 15 as batteries but are not intended to be limited thereto and other suitable power sources may be conveniently substituted.) The current also passes through capacitor C1 and resistor R1, in parallel with relay C, charging C1.

For relay 1C current passes through contacts *a*, $L^1$, $1C^2$, $2C^2$, $3C^2$, $1C^1$, relay 1C winding to the negative terminal of E.

The connection may be represented as:

```
                1       2     2     2     1
ground --A--L --┬1C --2C --3C --1C --relay coil 1C┬-battery
                |---relay coil C--┬---------------┘
                └---C1---R1-------┘
```

(Circuit 1)

Thus both relays C and 1C operate, operating contacts C and 1C.

Simultaneously, current through Circuit 1 is applied to silicon controlled rectifier SCR. This gates the SCR, turning it on by means of the circuit represented as:

```
                                   ┌-----------R3----------┐
ground--A--L1-┬1C2--2C2--3C2--R4--┴SCR gate--SCR cathode-┤-
              └-------------------------------------------C2┘

R2 battery
```

(Circuit 2)

so that current also then flows in the circuit:

ground—A—$L^1$—SCR anode—SCR cathode—R-2—battery (Circuit 3)

At this point, because relay 1C operates contact $1C^2$, the gate current is cut off. Because of the characteristics of an SCR, however, it continues to conduct through contacts A, $L^1$, R2 to battery.

The conduction of SCR and the operation of contact $1C^2$, ground both the emitter and the base of transmitter TR1, preventing relay 2C from operating during the first dial impulse. Capacitor C2 prevents SCR from being accidentally turned on when the circuit is energized. Thus, by the operation of the SCR circuit, the previously required OC relay, connected ahead of relay 1C, is eliminated.

Subsequently, the operation of relay A removes the ground applied to the register circuit through lead 12. Relay 1C is held through the following circuit connected through contact $1C^1$, switched to lead 15:

ground —$L^2$—lead 13—emitter-collector of TR2—$2C^3$—$1C^1$—relay 1C coil—battery (Circuit 4)

(At this time transistor TR2 is on because of base current through battery E, $R_7$ and lead 30, while the emitter is grounded by lead 13.) Also, relay C is held operated between pulses by the long time constant of the combination of capacitor C1 and resistor R1 connected in parallel to and discharging into relay C. Finally, the operation of relay A, opening contact A, shuts SCR off.

When the next dial impulse releases relay A, because relay 1C is operated, the gating path to SCR through R4 is open ($1C^2$ being closed to the emitter of TR1) thus SCR does not conduct, consequently transistor TR1 turns on, operating relay 2C through the circuit:

ground—A—$L^1$—$1C^2$—$2C^1$—emitter-collector of TR1—relay 2C coil—battery (Circuit 5)

Once relay 2C operates, its continued operation is maintained by the circuit:

ground—$L^2$—emitter-collector of TR2—$3C^3$—$2C^1$—emitter-collector of TR1—relay 2C coil—battery (Circuit 6)

This will keep it operated, even after the ground to circuit 5, above, has been interrupted by the reoperation of relay A.

By the operation of relay 2C and its contact 2C3, the holding circuit for relay 1C is switched to the circuit:

ground—A—$L^1$—lead 16—$2C^3$—$1C^1$—relay 1C coil—battery (Circuit 7)

Consequently, when relay A reoperates as mentioned, opening contact A, at the end of the second dial impulse, relay 1C releases, and because relay A remains operated more than the minimum interdigital time, relay C releases when capacitor C1 becomes discharged.

Relay 2C is held operated as described and when relay C is released, the first counting relay 2T operates through the circuit:

ground--$L^2$--lead 13 and 27--$1T^1$--$2T^1$--$C^1$--$F^2$--$5C^3$--$2C^4$--lead 18-
--------------------------------

$4C^5$--$D^5$--relay 2T winding $_{1-2}$--lead 19--TR5--battery
-------R16------------------------------

(Circuit 8)

Once relay 2T operates it is held operated until the call is completed through contact $2T^1$ connected to ground through contact $L^2$ and lead 13 and 17. Furthermore, when contact $2T^1$ operates, transistors TR3 and TR4 which were held in a cut-off state by the circuit:

ground—$L^2$—leads 13 and 17—$1T^1$—$2T^1$—lead 20—D4—R14—lead 21—battery (Circuit 9)

conduct because of the base current supplied to the transistors through resistors R14, R10 and R12. When transistor TR3 conducts, transistor TR2 is turned off while capacitor C3 discharges for a fixed period of time. The predetermined time interval of the turn off is determined by the time constant of resistor R7 and capacitor C3. Because the conduction of TR2 is used to hold the last operated relay 1C through 5C, operated during counting, relay 2C releases and transistor TR1 is cut off.

This completes the counting operation of the circuit for the first digit of the number 20. After the completion of the dialing of 2 relay 2T has been operated, and transistors TR3 and TR4 are conducting.

Counter relays 1T and 2T, as has been shown, are two-winding relays with operate and hold windings. Transistor TR5 is connected in a switching circuit to the operate windings because the register output contacts are used to transmit and receive other signals. Thus, after either counter relay 1T or 2T has operated, the operate windings of 1T and 2T are still connected to the register output, but if ground is sent to the register output contacts for another purpose the second counter relay is prevented from operating by the cut-off condition of transistor TR5. This permits the register output contact circuit to be used for two functions sequentially. Alternatively, if there is a surplus of contacts on the register relays, then counter relays 1T and 2T may have one winding and the transistor switching circuit of TR5 may be eliminated.

Now, as the person dials the 0 of the number 20, relay A, in response to the dial impulses from the telephone, repeates the release-operate sequence ten times. In the same manner as for the first digit, as explained previously, on the first release, relay 1C operates; on the second release relay 2C operates; and on the second operation, relay 1C releases. When relay A releases the third time, since relay 2C is now operated, relay 3C operates by means of the circuit:

ground—A—$L^1$—lead 12—$1C^2$—$2C^2$—$4C^1$—$3C^1$—lead 22—relay 30 coil—battery, (Circuit 10)

and relay 3C is held operated by means of contact $3C^1$. On the other hand, relay 2C has its holding ground switched to the impulse output of the intercom circuit by contact $3C^3$ and consequently relay 2C releases upon the third operation of relay A.

In the same manner, by the fourth release of relay A, relay 4C operates through the circuit:

ground—A—$L^1$—lead 12—$1C^2$—$2C^2$—$3C^2$—$4C^2$—relay 4C coil—battery (Circuit 11)

and relay 3C releases when relay A operates the fourth time. After relay 3C releases, the register circuit operates for A's fifth and sixth releases in the same manner as during the first and second times A released, except that while relay 4C is held operated during this time, relay 1C operates again on the fifth release of A, relay 2C operates again on the sixth release of relay A, and relay 1C releases when relay A operates the sixth time.

When relay A releases the seventh time, since relays 2C and 4C are then operated, relay 5C operates through the circuit:

ground—A—$L^1$—lead 12—$1C^2$—$2C^2$—$4C^1$—$5C^1$—relay 5C coil—battery (Circuit 12)

and relay 5C is held operated through contact $5C^1$ and ground. On the other hand, because relay 4C, previously held operated, now has its hold ground switched over by contact $5C^2$ to the dial impulse input on line 12 of the register circuit 3, it releases when relay A operates for the seventh time. However, because at this time relay 3C is not operated, the hold ground for relay 2C continues after the seventh operation of relay A through the circuit:

ground—$L^2$—leas 13—TR2—$3C^3$—$2C^1$—TR-1—relay 2C coil—battery (Circuit 13)

The register changes from this condition, (that is, relay 5C and relay 2C operated,) upon the eighth release of relay A, when relay 3C operates through the circuit:

ground—A—$L^1$—$1C^2$—$2C^2$—$4C^1$—$3C^1$—relay 3C coil—battery (Circuit 14)

Relay 3C is held operative by contact $3C^1$. At this time, relay 2C has its hold ground switched from $L^2$ to the dial impulse output $L^1$ of the intercom circuit by contact $3C^3$, and consequently releases when relay A operates the eighth time. When relay A releases a ninth time, relay 4C operates through Circuit 11 described above, and relay 4C is held by the circuit:

ground—$L^2$—lead 13—TR2—$3C^4$—$5C^2$—$4C^2$—relay 4C coil—battery (Circuit 15)

Relay 3C is released when relay A operates the ninth time, relay 4C has its hold ground switched by contact $3C^4$ and also releases. That is, after the ninth operation of relay A, only relay 5C is held operated. When relay A releases for the tenth time, Circuit 1 is reestablished, relay 1C again operates, and upon the 10 operation of A, the counting of the digit 0 dial impulses is finished. The relay operations of the counting circuit for 10 dial impulses may be summarized as shown in the following table:

Table 1

| Counting Relays: Relay A Released and Operated | 1C | 2C | 3C | 4C | 5C |
|---|---|---|---|---|---|
| First time | X | | | | |
| 2nd | | X | | | |
| 3rd | | | X | | |
| 4th | | | | X | |
| 5th | X | | | X | |
| 6th | | X | | X | |
| 7th | | X | | | X |
| 8th | | | X | | X |
| 9th | | | | | X |
| 10th | X | | | | X |

Note: "X" denotes that the relay operates.

When the sending of the dial impulses from the telephone set stops since relay A remains operated, relay C, held in operated up to this point, releases. While Relay C was operated, a current path was completed:

ground—$L^2$—lead 13—D2—TR4—R15—$C^2$—capacitor C4—battery (Circuit 16)

This charged capacitor C4, so that when relay C releases, capacitor C4 is discharged through relay F by the circuit:

battery—C4—$C^2$—D3—relay F coil—battery (Circuit 17)

Relay F is operated by the discharge current and self-holds through contact $F^1$, and lead 13.

Further, as previously described, relay C was operated and held operated during the counting of the digit 2. 2 dial impulses. It released when the counting for the digit 2 was completed, operated again and was held operated during the counting of the digit 0 dial impulses. However, while relay C operated during the counting of the digit 2, or first digit, transistor TR4 was cut off by a ground applied to its base through the circuit:

ground—$L^2$—$1t^1$—$2t^1$—D4 (Circuit 18)

Consequently, even with relay C operated, capacitor C4 was not charged during the counting of the digit 2. Transistor TR4 can be turned on only after the counting of the first digit impulses is finished and either relay 1T or 2T is operated. Consequently, by means of the operation of relay C and the conduction of TR4 during the counting of the second digit, when the counting of the second digit impulses is finished, capacitor C4 is charged, and relay F operates when relay C releases. When relay F operates, contact $F^2$ operates, in this example register output 20, the key telephone connected to register output 20 and the signal source circuit means 2 are connected.

This explains the operation of the register circuit for the dialing of the number 20 and the operation for other intercom numbers is similar. No detailed explanation will be given for each of these, except to tabulate, in Table 2, the operated relays at the completion of dialing for each intercom number.

Table 2

| Dial Number | Final Operating Relay | | Dial Number | Final Operating Relay | |
|---|---|---|---|---|---|
| 11 | 1C | 1T, F | 21 | 1C | 2T, F |
| 12 | 2C | do. | 22 | 2C | do. |
| 13 | 3C | do. | 23 | 3C | do. |
| 14 | 4C | do. | 24 | 4C | do. |
| 15 | 1C,4C | do. | 25 | 1C,4C | do. |
| 16 | 2C,4C | do. | 26 | 2C,4C | do. |
| 17 | 2C,5C | do. | 27 | 2C,5C | do. |
| 18 | 3C,5C | do. | 28 | 3C,5C | do. |
| 19 | 5C | do. | 29 | 5C | do. |
| 10 | 1C,5C | do. | 20 | 1C,5C | do. |

As explained in detail above, it is possible to transistorize the control portion of a register without losing the advantages of relay counting circuits, decimal counting being accomplished by five counting relays 1C to 5C, and the miniaturization of a relay register is thereby attained through reduction in the overall number of relays required.

Turning again to FIG. 1, dial tone is supplied from the call status tone supply 18 via the speech path switching circuit of register 17, and the L contact, via the T and R conductors to the key telephone set 100 and is heard by the station user. Upon receipt of dial tone, the station user proceeds to dial the two digit code assigned to the key telephone set station to be called.

If a rotary dial is used, conventional impulses cause the A relay to pulse. The release of relay A for each impulse applies ground through the closed L break contact to the dial pulse counting and digit steering circuits in the register 17. If dual-tone multifrequency (DTMF) dialing apparatus is used, conventional DTMF signals are sent over the T and R leads, and via the L contacts to the DTMF receiver in the register 17. Although conventional DTMF receivers can be used, the temperature-compensated DTMF receiver described in detail in copending patent application, Ser. No. 348,278 (Case 19) filed on Apr. 5, 1973 by Yuji Tanaka, Matsuo Takaoka and Kuzuhiro Gosho may be used. In either case the DTMF receiver responds to these signals and operates relays in the digit steering and pulse counting circuit corresponding to the digit represented by the DTMF tones.

At the end of the first digit the dialed digit is transferred to the relays in the output contact tree of the register 17, and the dial pulse counting circuit is reset for the next digit. At the same time, in response to a signal from the digit steering circuit, dial tone is removed from the intercom line by the speech path switching circuit. The second digit, like the first, is counted by the dial pulse counting circuit, or detected by the DTMF receiver, and stored in the counting circuit.

At the end of the second digit, the digit-steering circuit sends a signal to the lockout and sequence control circuit, via the output timing circuit. The timing circuit sends a ground pulse which appears simultaneously on the LS lead and one of the LN leads, selected by the output tree and dial pulse counting circuit in response to the dialed number. The LN lead ground turns on the selecting circuit (FIG. 2) in the called key telephone set which thereupon connects the –24 volt supply to the TD and TR relay coils. Relay TR operates via ground from the register 17, on the LS lead, and transfers its coil directly to –24 volts at its make contact *tr*. It is preferred to use the selecting circuit described in copending patent application Ser. No. 341,201, filed on Mar. 14, 1973 by Stephen Kerman, Hachiroh Takubo and Kengo Sudoh, entitled "A TRANSISTOR SWITCHING CIRCUIT FOR USE IN A TELEPHONE SYSTEM."

B. Switching Circuit

Figure 16:
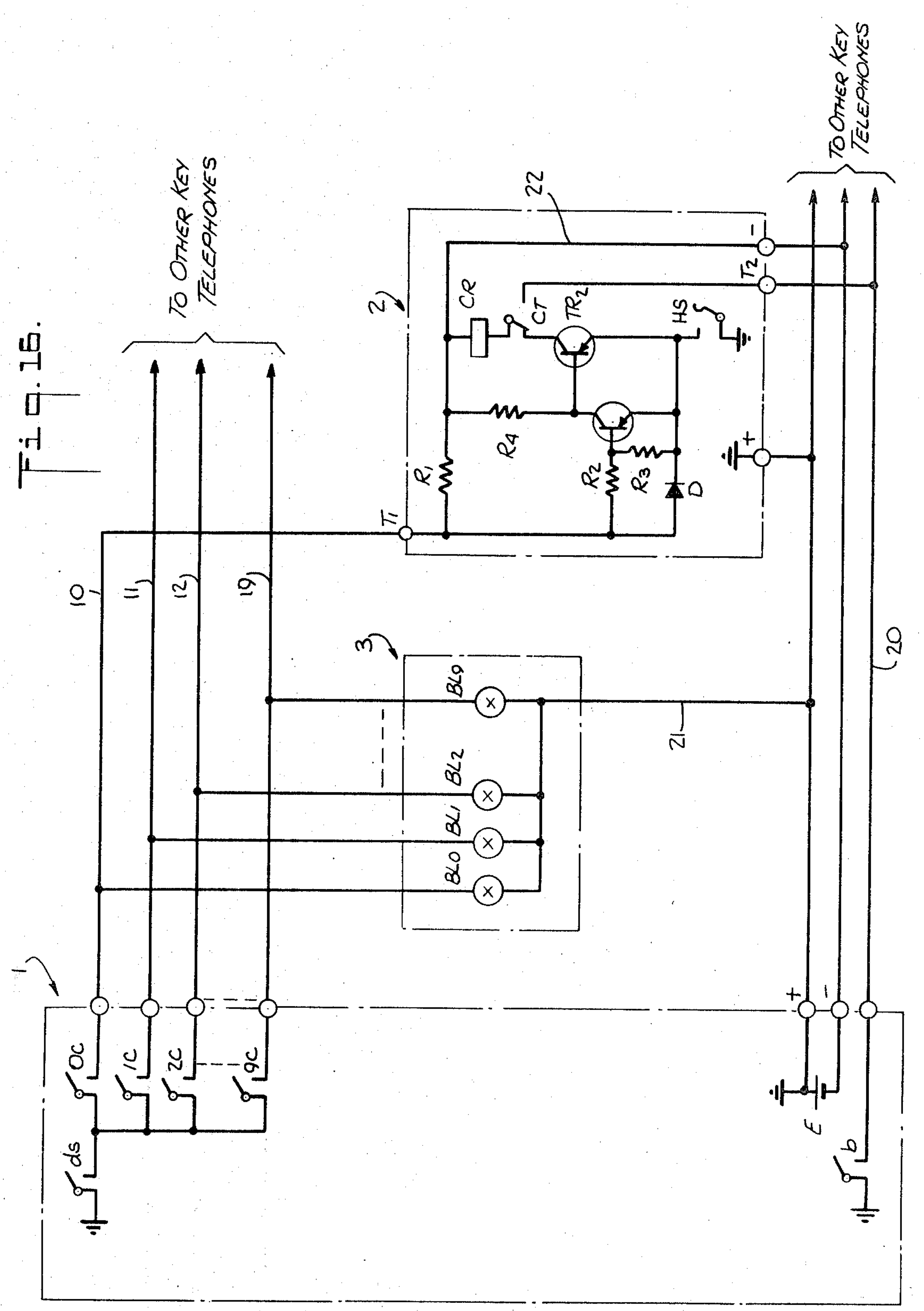
FIG. 16 illustrates in schematic form a transistor switching circuit for use as the selecting circuit 30 in the key telephone system depicted in FIGS. 1, 2.

In particular, referring to FIG. 16, such transistor switching circuit is incorporated in a key service unit which includes a signalling circuit 1 coupled to a key telephone set 2 which are only illustrated in the parts essential to an understanding of the switching circuit. In FIG. 16, a busy indication lamp field 3 is furnished remotely from the key telephone set 2 and has one busy indication lamp for each of the key telephone sets connected to the system.

Within the key service unit 1, OC to 9C are contacts on relays OC to 9C of the counting circuit, part of a signalling circuit, (not shown in the drawing) for each of the key telephones connected to the key service unit 1 by lines 10, 11, 12 through 19. One of relays OC to 9C are operated in response to the intercom directory number dialled at a key telephone set when an intercom call is originated. Relay B in the counting circuit (not shown) has a contact *b* which is operated at the beginning of an intercom call by the signalling circuits of the key service unit, in response to the originating station, and relay B remains operated until the intercom signalling operation is completed. The contact, *b*, on relay B, is connected from ground through conductor 20 to a contact of the CR relay in key telephone set 2 and a similar contact on each key telephone set in the system. It is a holding circuit, the operation of which will be explained infra.

The contact *ds* is on relay DS of the counting circuit (not shown) and is connected between ground and the contacts OC, 1C, 2C through 9C. Relay DS operates simultaneously with the operation of one of the relays OC to 9C, remaining operated only for the time required to operate relay CR in key telephone set 2, after which it is released.

A. To explain the various functions and conditions of operation in the switching circuit, the sequence of transmitting and receiving signals among key service unit 1, key telephone set 2 and busy indication lamp field 3 will be outlined. The example considered will be for a key telephone set having an intercom directory number 0. When this key telephone set is called on the intercom signalling circuit by the caller dialing the number 0 at his key telephone set, a counter circuit in the key service unit 1 operates, contacts *b*, OC, and *ds* in the key service unit 1 close. Ground is thereby extended from *ds*, through closed contact OC and the lead 10, to terminal T1 of key telephone set 2. This ground thereby appears at the emitters of transistors TR1 and TR2 through diode D and simultaneously through resistor R2 at the base of transistor TR1. Since the base-emitter junction of transistor TR1 is not forward biased under these conditions, no collector current flows in TR1. Transistor TR2 has a base current flow through resistor R4, and via the negative lead 22 to power source E in the key service unit, causing current flow in TR2 from the emitter to the collector of TR2. The collector current in transistor TR2 flows through relay CR to the lead 22, connected to the negative terminal of a power source E. Consequently, relay CR operates, and is held operated by the hold ground sent via lead 20 from the key service unit 1, through its make-before-break contact *cr*.

When the above mentioned ground is placed on the lead 10, busy indication lamp BLO mounted on the busy lamp field is simultaneously grounded and lights. The grounding of this lamp occurs, however, only during the time interval required to operate relay CR as described aobve. Since relay CR is held by the ground connected through lead 20, the *ds* contact is closed only long enough to operate relay CR. BLO is falsely illuminated therefore only for this short period, which is too short to interfere with the busy indication function. The operation of relay CR completes a signalling circuit (not shown in FIG. 16) by means of its other contacts, thereby alerting the called party to the incoming call at his telephone set.

B. In the event the key telephone set operates its hookswitch while the CR relay is not operated, contact HS is closed. A circuit is thereby established from ground, through contact HS, through the emitter-base junction of transistor TR1 through resistor R2, over lead 10 through lamp BLO, over lead 21 to power source E. TR1 is saturated and lamp BLO lights to indicate that key telephone set 0 has its switch hook operated (that is, it is busy). Simultaneously, ground appears at the emitter of transistor TR2 from hookswitch HS, but the current to lamp BLO flowing through the emitter-base of transistor TR1, causes saturated collector current flow in transistor TR1 through resistor R4 and lead 22 to battery E. Consequently, the emitter-base forward bias of transistor TR2, shorted by saturated transistor TR1, is insufficient to turn on transistor TR2. Therefore, transistor TR2 does not conduct and relay CR does not operate. By the operation of the transistors TR1 and TR2 in the key telephone set 2, a busy signal is transmitted over line 10 to the busy indication lamp field 3, illuminating lamp BLO while not operating relay CR of the intercom signalling circuit.

Normally, when hookswitch HS closes, the base-emitter current flow through TR1 flows through BLO as described above. Resistor R1 is provided, however, to prevent the false operation of relay CR if the busy lamp circuit should inadvertently be opened and the hookswitch HS raised. Without this resistor, ground applied to the emitters of TR1 and TR2 by HS would not cause base current of transistor TR1 to flow, not causing transister to conduct, and consequently, the base-emitter current of transistor TR2 would flow, through R4, lead 22 to source E, causing relay CR to operate.

In the event a key telephone set is called while its hookswitch is raised, the busy indication lamp is already illuminated as described above and transistor TR1 is already in a conducting state, forcing transistor TR2 into a nonconducting state. At this moment, if the key telephone set is called by another key telephone set, a ground appears at the appropriate counting output lead, in this example, lead 10 of key service unit 1. Current flows from ground through lead 10, through the busy lamp indicator BLO and over lead 10 through R1 in the called key telephone set, through lead 22 to the battery E. Consequently, the base of transistor TR1 is grounded cutting off transistor TR1. When transistor TR1 is cut off, the base current of transistor TR2 flows through resistance R4, transistor TR2 conducts and relay CR operates. Thus, even if the called key telephone set has its hookswitch closed, and the intercom signalling conductor is being used to light the busy indication lamp, the intercom signalling operation is performed without hindrance.

Therefore, it is possible to exercise simultaneous independent control over two independent functions (in the present example, an intercom call signal and the lighting of a busy indication lamp) in opposite directions using a single conductor.

Returning again to FIG. 1, as noted above, relay TR operates via ground from the register 17, on the LS lead, and transfers its coil directly to −24 volts at its make contact *tr*. At the end of the period of the ground pulse, ground is removed from the LN lead by the output timing circuit and a constant voltage source is connected between the LS lead and ground.

As described with reference to FIG. 16, a current flows through this source, over the LS lead to the TR relay, which is held operated, via the *tr* contact to −24 volts. The current is greater than the necessary value required to hold the TR relay, but less than the value required to operate it.

If the called station is on-hook, ground at its hookswitch break contact HS via break contact *ex* is extended via make contact *tr* to the LT and LR leads. Current flows over this path to the speech path switching circuit to indicate that the station is idle. Thereupon, the speech path switching circuit sends a short burst of tone to the originating station via the intercom line circuit and T and R leads, and to the called station via the LT and LR leads.

The preceding operation of relay TR also supplies power to the voice switching circuit (FIG. 2) and amplifiers AM and AS in the called station. The tone burst appearing on the LT and LR leads passes into the voice switching circuit and through the AS amplifier to the speaker, where it is reproduced. At the end of the tone burst period, leads LT and LR are switched at the speech path switching circuit to the T and R leads, thus permitting the calling party to carry on a conversation with the called party, who uses the microphone 12 and speaker 14 in a hands-free mode of operation. This hands-free conversation may occur for a limited period of time, under control of the register time-out circuit. For prolonged conversation, the called party lifts the handset and presses the intercom line key ICMLK corresponding to the intercom line on which the call was originated. This condition is recognized by the flashing of lamps ICMLL corresponding to the intercom line circuit. All lamps ICMLL receive interrupted ground from the interrupter via the respective L relay contacts over the respective L leads.

While a conventional interrupter can be used in the key telephone system herein described, it is preferred to use the interrupter described in copending application, Ser. No. 348,278, filed on Apr. 5, 1973, by Hachiroh Takubo and Fumio Tsutsumi, entitled "SIGNAL INTERRUPTER CIRCUIT FOR A KEY TELEPHONE SYSTEM."

C. Interrupter Circuit

Figure 17:
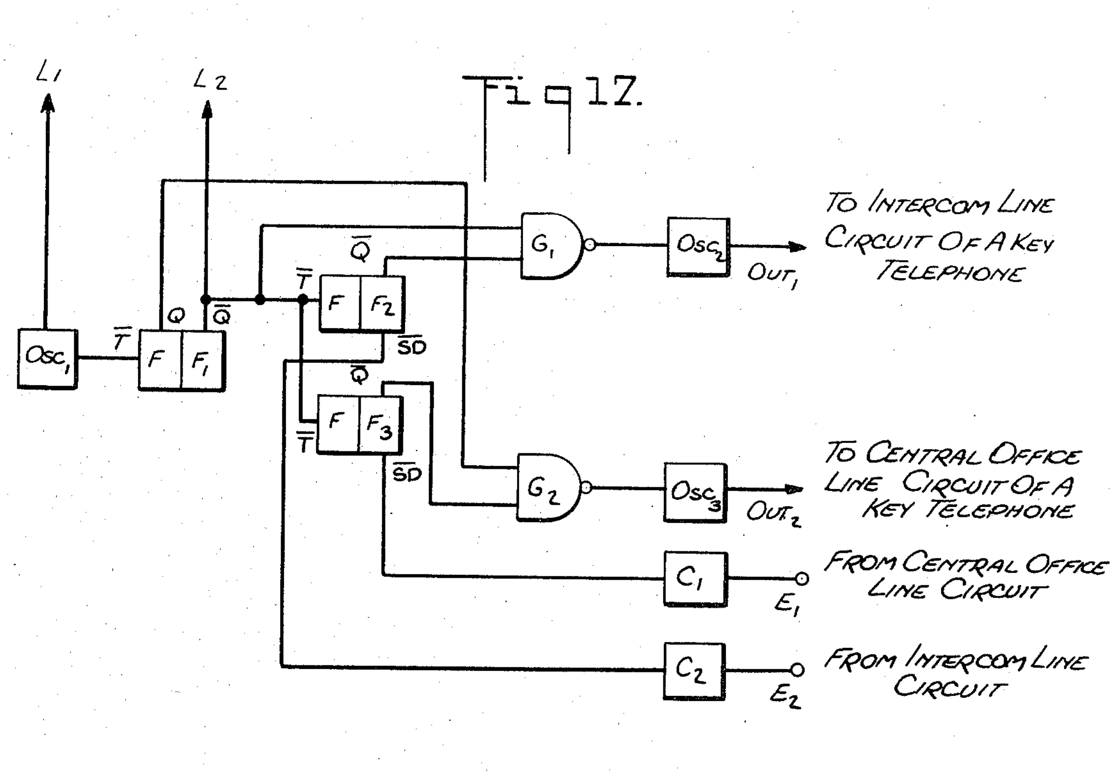
FIG. 17 is a block diagram of a signal interrupter circuit.
Figure 18:
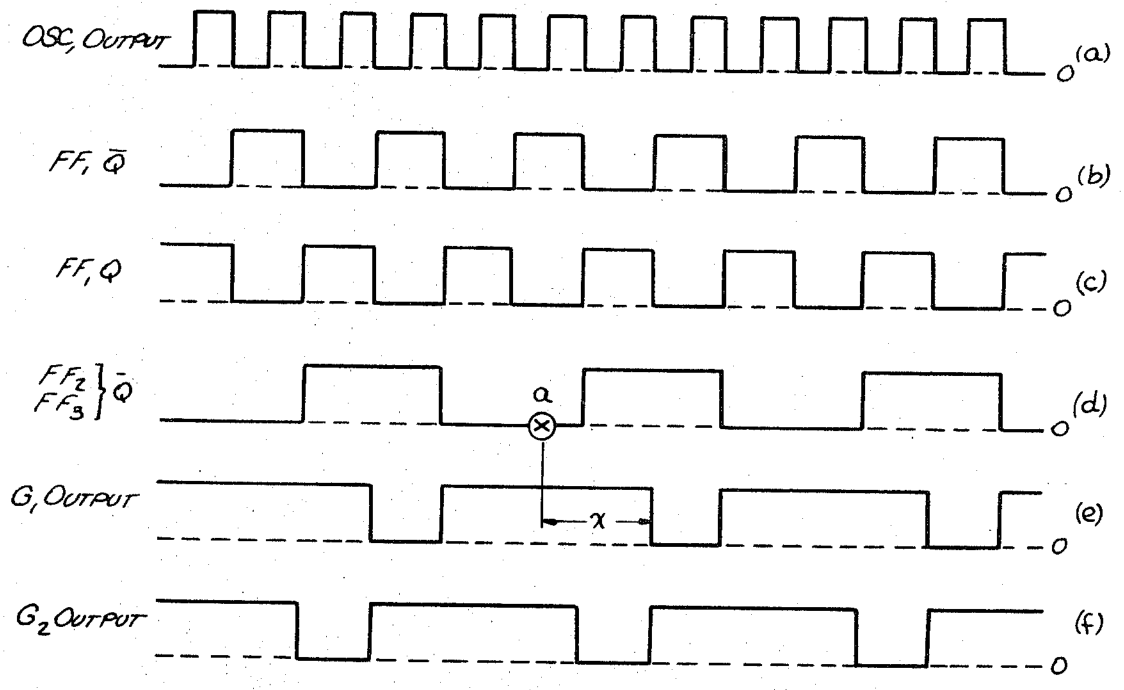
FIG. 18 is a plot of voltage signals at various locations in the circuit depicted in FIG. 17, plotted against time.

In particular, referring to FIGS. 17, 18, a pulse generator OSCI, generates output pulses at a predetermined frequency four times the desired repetition rate of the audible signals. The outputs of a plurality of JK flip-flop circuits FF1, FF2, and FF3 are connected to the inputs of NAND gates G1 and G2. OSC2 and OSC3 are audio frequency signal generators used to generate intercom and central office call arrival signals for a key telephone system and are operated by the outputs from NAND gates G1 and G2 respectively.

Output terminal OUT1 is connected to the intercom line audible signalling circuit of a key telephone system while terminal OUT2 is connected to a central office line audible signalling circuit of a key telephone system. L1 and L2 are output terminals which may be connected to the key telephone system lamp flashing control circuits. The outputs of circuits C1 and C2 are connected as inputs to control flip-flop circuits FF2 and FF3 respectively. The circuits C1 and C2 are comprised of either relay contacts or transistor switching circuits. Terminals E1 and E2 receive start signals from the signal control circuits when an incoming central office call (terminal E1) or an intercom call (terminal E2) occurs, and until such calls are answered.

Upon the arrival of a start signal at terminal E1, due to the arrival of a central office call, circuit C1 (a relay or transistor switching circuit) starts the JK flip-flop circuit FF3. The clock input to circuits FF2 and FF3 is the complementary output of the JK flip-flop circuit FF1, equal to one-half the fixed output frequency of CSC1. The outputs of FF1, FF1Q and $FF1\bar{Q}$ respectively, have the waveforms shown in FIGS. 18(*b*) and (*c*) respectively, FIG. 18(*a*) representing the output of OSC1. The JK flip-flop circuits FF2 and FF3, therefore, have outputs $FF2\bar{Q}$ and $FF3\bar{Q}$, shown in FIG. 18(*d*). These outputs are then each fed to one of the inputs of NAND gates, G1 and G2 respectively.

The other inputs to NAND gates G1 and G2 are the outputs of the JK flip-flop circuit FF1, FIG. 18(*b*) and (*c*) respectively. Because the output of the NAND gate G1 only becomes low when both its inputs are high, the output of NAND gate G1 is as shown in FIG. 18(*e*). Similarly, the output of NAND gate G2 is low only when both its inputs are high, and therefore the output of gate G2 is as shown by FIG. 18(*f*). These outputs are used to drive oscillators OSC2 and OSC3 respectively, which only produce outputs when their inputs are low. The OSC2 and OSC3 outputs are fed to key telephone system through terminals OUT1 and OUT2 to give an audible indication of intercom and central office calls respectively.

If there is an intercom start signal applied to terminal E2 simultaneously with the central office call start signal on terminal E1, the oscillator OSC2 produces a periodic output tone signal on output terminal OUT1 which has the same intervals as the periodic output tone signal on terminal OUT2 but is displaced in time, as shown in FIGS. 18(*e*) and (*f*).

Thus, when an incoming central office line signal applies a start signal to terminal E1 at time *a*, (FIG. 18(*d*)) the output signal of NAND gate G2 is delayed by a predetermined time delay X as shown in FIG. 18(*e*).

As clearly shown by comparing FIGS. 18(*e*) and (*f*), the two signals are displaced in time. Consequently, even if an intercom and a central office call arrive simultaneously, because the audible signals are staggered, they are easily distinguished from each other.

Returning again to the description of the key telephone system shown in FIGS. 1, 2, when the called station answers by lifting the handset and operating the intercom line key, the called station places ground from its hookswitch contact HS via line key contact ICMLK on the S lead, operating the D relay in the intercom line circuit. The D relay releases the L relay, releasing the register 17. The called station's transmission network is then connected across the T and R leads by the intercom line key contacts ICMLK, and the called and calling stations are thus connected in parallel across the transmitter current supply relay coil A, permitting conversation to occur. Release of the register 17 opens the LS lead, releasing the TR relay in the called station. Hookswitch contact HS via the telephone selecting circuit lights to busy lamps, corresponding to called and calling stations, in the direct station selecting apparatus in key telephone set 200, steadily, from ground applied via the LN lead.

V. Direct Station Selection Intercom Communication

In accordance with another aspect of the present invention, the operator attended key telephone set 200 incorporates direct station selection (DSS) apparatus. Key telephone set 200 also includes conventional dialing apparatus, a transmission network and handset 20, and line and hold keys of the same kind incorporated in key telephone sets 100.

In further accordance with the invention, key telephone set 200 incorporates a direct station selection field comprising a key and a lamp associated therewith, for each key telephone set 100 in the system. Moreover, the key telephone set 200 incorporates a speech path switching circuit, output timing circuit and supervisory control circuit described in detail below.

The line key assembly of telephone set 200 is connected to the leads of the office line and intercom line circuits 11, 16, like any other station, permitting access to these lines in the same manner as any other station set. When an incoming call arrives, the COLL lamp of the line flashes under control of the line circuit 11; the call is answered by lifting the handset and pressing the corresponding line key, operating make contacts COLK. The line circuit 11 then lights the lamp COLL steadily and the ringing from the central office is tripped in response to the ground placed on the H lead by the hookswitch contact HS via the hold key break contact HK, the supervisory control circuit and the break contact COLK and the transmission network shunt placed across the line through the HS contact, speech path switching circuit and COLK contacts.

Assuming that conversation occurs during which the operator-attendant of telephone set 200 determines the internal party to whom the call should be directed, the operator-attendant then presses the direct station selection key (not shown) in FIG. 1 corresponding to the desired party. This apparatus and function are described in detail below with reference to FIGS. 19, 20. The supervisory control circuit below described in response thereto initiates a hold condition on the office line circuit by an electrical sequence identical to that of the hold key operation, but occurring automatically. The transmission network of telephone set 200 is disconnected from the orifice line by the speech path switching circut.

Simultaneously, ground from the lockout circuit in the register 17 via the output timing circuit in key telephone set 200, and a contact of the operated DSS key, is applied momentarily to the DS lead and LN lead of the called station, operating the TD relay in the called station in the same manner in which the register operates the TR relay, described above. The TD relay completes a path from the DT and DR leads to the talkback circuit and energizes it as described above. In a similar manner to the register 17, the DSS performs a test of the called station over the DT and DR leads to determine its status.

If the called station tests busy, the transmission network of telephone set 200 is connected to busy tone from the call status tone supply 18 in the key service unit 300. If the called station is found idle, a short splash tone is sent to the calling and called parties, and they are subsequently connected together by the speech path switching circuit in the telephone set 200. Talkback conversation may then occur between the two parties in the same manner as by connection through the register 17, except that there is no time limitation.

If, during the period that the register 17 is being used to provide an intercom talking path to a station through its talk-back circuit, the DSS circuit attempts to establish a connection to another station, the selecting circuit at the second station is turned on momentarily. Since there is already one connection through the LT and LR path, the TR relay of the first station is already operated and is being held by a constant voltage source over the LS lead. If direct ground were used to hold the TR relay in the first set, turning on the second selecting circuit would cause the TR relay in the second to operate falsely. Thus both TR and TD relays would operate in the second key telephone set. However, the constant voltage source mantains the current flow through any TR relay at a value between the hold and non-operated values, preventing false TR relay operation in the second station while still holding the TR relay in the first set.

The same conditions apply in reverse when the register establishes a connection during the time that the DSS is talking to another station. Furthermore, if the register and DSS both attempted coincidentally to select stations, ground pulses could be applied simultaneously to the LS, DS and two LN leads. This would cause false connections to be established. However, the lockout and sequence control circuit prevents this by causing the selecting ground pulses to be sent out and both selections to occur sequentially without any disruption of the operating procedure. The time delay introduced is too short to be noticeable to the user, while this method of operation considerably reduces the number of leads which would otherwise be necessary between the register 17, DSS 200, and all other stations.

If the DSS attendant determine upon the first attempt that the called station is unable to speak with the office line caller waiting on hold, it may be necessary to try another station instead. The DSS supervisory control circuits are arranged to recycle if any other DSS key is pressed, thus releasing the first station and seizing a second one in its place, while the office line remains on hold. Meanwhile, since the hold condition has been established electrically and without the operation of the attendant's hold key, the office line key contact COLK is still operated. If after one or more attempts, the attendant finds it necessary to speak with the outside party again, pressing the station release key (not shown) on the DSS set releases the speech path and supervisory control circuits, reconnecting the transmission network of the telephone set 200 to the correct office line without possibility of loss of the call being held or intrusion into an incorrect line.

If on the other hand, after speaking with the inside party, the operator-attendant determines that further action is not required of her in the call, she may attend directly to another call by pressing the appropriate line key, closing make contacts LK. In doing so, the supervisory and control circuits are again released while the previously operated line key is also released by the operation of the next line key. Thus, she is connected to the next call while the previous call remains held. The speech path switching and supervisory control circuits then, simplify all operating sequences to a single operation, providing great improvement in the operating speed and convenience and reducing the possibility of error.

A further feature of the DSS station apparatus is the lamp drive circuit and hold detector circuit, connected between the DSS station's hold and lamp leads, and those of all other stations. These circuits distinguish between calls held by the DSS key telephone set station 200, automatically or manually, and those held by all other stations. Those held by the DSS station 20 appear at all key telephone set stations including the DSS station as the normal 120 interruptions per minute (ipm) wink signal. Those held by all other stations appear interrupted at 120 ipm only at those other stations, while a 15 imp wink lamp appears at the DSS station 200. Thus any held call appearing at the DSS station 200 is one which has not been successfully passed to any of the other stations, and therefore requires prompt attention by the attendant. Calls which are at some time answered by the other stations and reheld for transfer or some other purpose, do not require operator-attendant intervention, and by using less attention drawing visual signals for these held calls at the DSS station 200, additional extraneous signals are removed, permitting the operator-attendant's attention to be better focussed on those calls in which she actually has some responsibility. This simplification further enhances the quality of key telephone system service provided to the users and their customers.

A. Particular Features of DSS Apparatus

Figure 19:
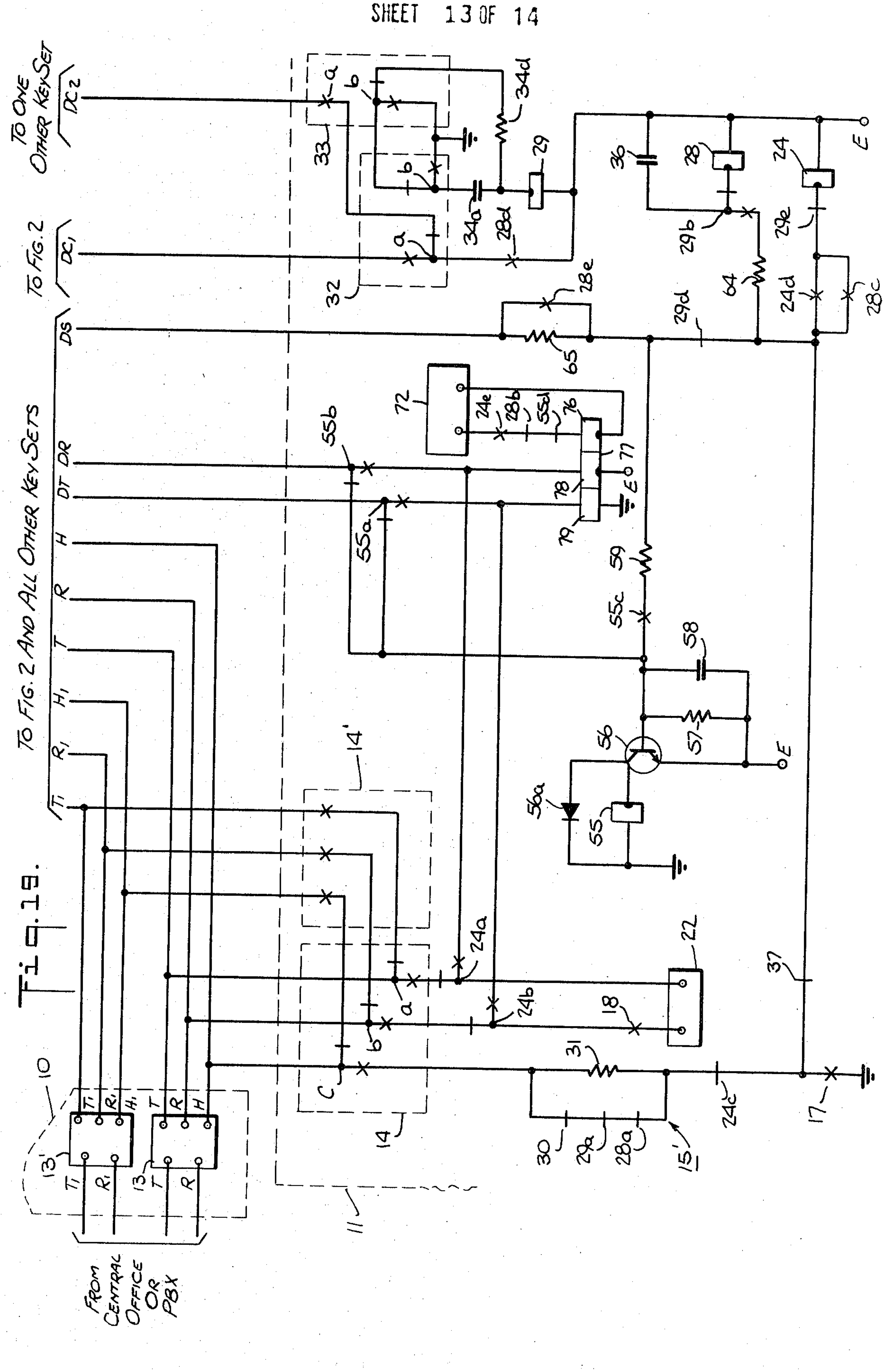
FIG. 19 is an electrical schematic and block diagram showing a portion of a key service unit, and one key telephone set connected thereto and incorporating direct station selection (DSS) apparatus.
Figure 20:
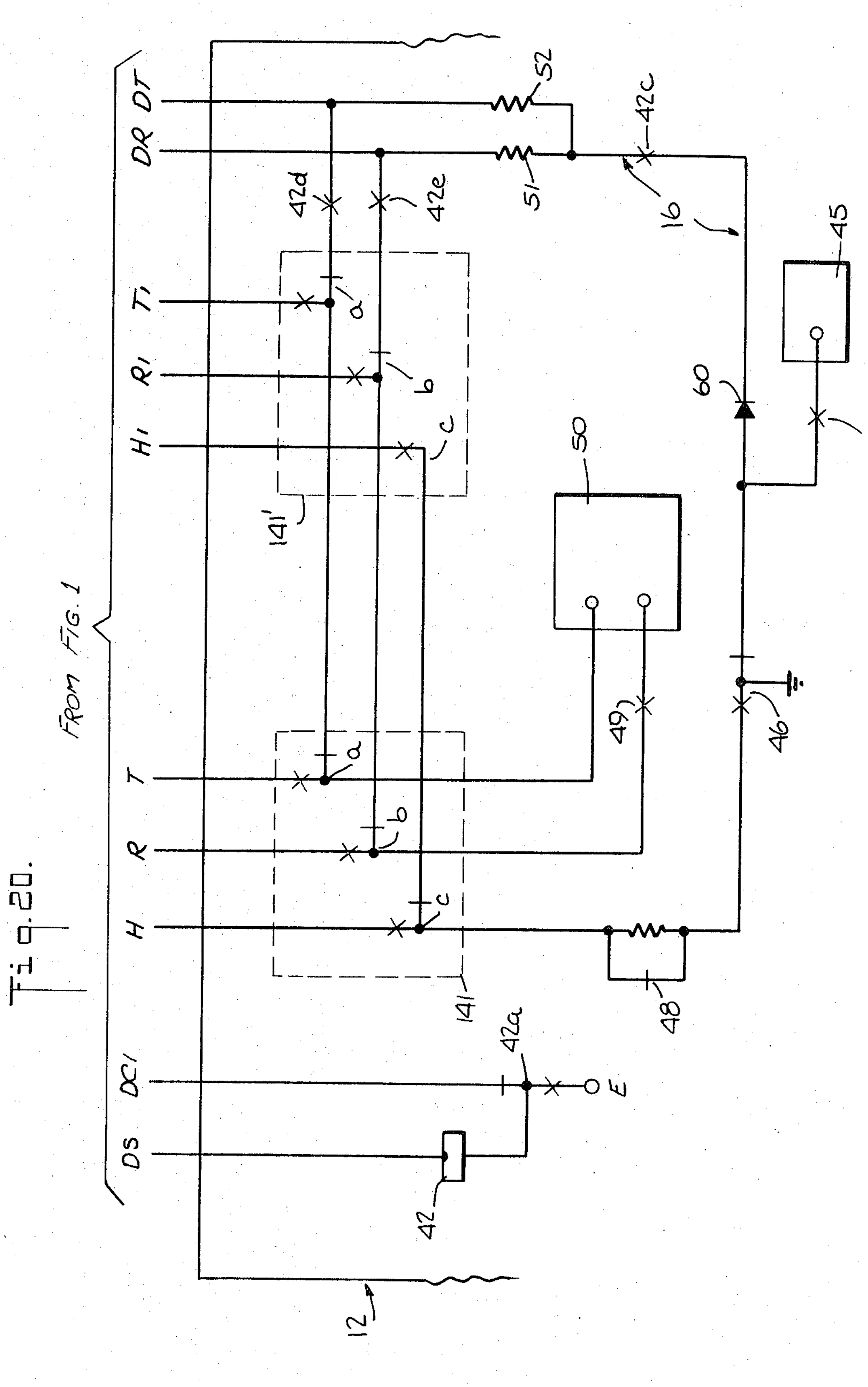
FIG. 20 is an electrical schematic and block diagram showing a typical key telephone set, which is to be connected to the apparatus of FIG. 19.

Referring now to the DSS apparatus* depicted in detail in FIGS. 19, 20, a key telephone system in accordance with the invention includes a key service unit 10 and an operator-attended key telephone set 11 electrically connected thereto. The system additionally includes a plurality of key telephone sets 12, only one of which is illustrated (FIG. 20).

* Described in copending patent application, Ser. No. 344,219 filed on Mar. 23, 1973 by Stephen Kerman and Fumio Tsutsumi.

In addition to the conventional apparatus incorporated in the key service unit 10, the unit also includes a plurality of line circuits 13 for connection to a corresponding plurality of central office of PBX lines. For convenience in explanation of the invention, only two such circuits 13, 13' and their incoming leads, T, R and T1, R1 are shown in the drawings.

As is conventional, the T, R, H and T1, R1, H1 leads of circuits 13, 13' are connected to line keys 14, 14' and 141, 141' of telephone sets 11, 12 respectively, and as well to the corresponding line keys in the other key telephone sets incorporated in the system.

Although conventional line circuits 13, 13' may be incorporated in the key service unit 10, it is preferred to use the universal line circuit described above with reference to FIGS. 11–14.

It is contemplated that key telephone set 11 will be attended by an operator trained to answer incoming calls to the system and to route such calls to the appropriate one of key telephone sets 12. Accordingly, in addition to being equipped with a plurality of line keys 14, 14' and a conventional transmission network 22, the set 11 additionally includes an intercommunication or intercom control network means 15, and automatic call holding apparatus means 15'. The key telephone set 11 is additionally equipped with a plurality of intercom station selection keys 32, 33, each one of which is coupled by individual control leads DC1, DC2 to a different key telephone set 12. For convenience in explanation of the invention, only two such keys are shown in FIGS. 19, 20.

Each key telephone set 12 in the system is also equipped with a plurality of office line keys 141, 141', a conventional transmission network 50 and an intercom circuit means 16.

It is to be understood that, in the ensuing description, apparatus conventionally found in a key telephone system is not described in detail, since such apparatus and the operation thereof are well known to those of skill in the art. Moreover, it is to be noted that, where appropriate in the drawings, the apparatus illustrated has been shown in detached contact schematic form.

When an incoming call from a central office or PBX is connected over the T and R leads to a line circuit in the key service unit 10, for example, line circuit 13, and an appropriate indication of call arrival has been given at the key telephone sets 11, 12, the operator-attendant of set 11 lifts its handset (not shown) thereby closing hookswitch contacts 17, 18, and operates the appropriate line key 14, thereby connecting the universal line circuit's T and R leads via line key make contacts 14*a*, 14*b*, relay 24 break contacts 24*a*, 24*b* and hookswitch contact 18 to the transmission network 22. Moreover, ground is coupled to the line circuit's H lead via hookswitch make contact 17, break contacts 24*c*, 28*a* and 29*a* of relays 24, 28 and 29, respectively, hold key break contact 30, and ilne key make contact 14*c*. This ground connection causes the line circuit 13 to assume its "talk" mode. At this time, the operator-attendant can talk to the calling party.

If the calling party wishes to speak to a party at one of the key telephone sets 12, the operator-attendant operates intercom station selection key 32 to initiate intercommunication with key telephone set 12, for example. Ground is thereby connected through make contact 32*b* of line key 32 through capacitor 34*a*, to a winding on a first relay means 29, thence to common power source E. The charging of capacitor 34*a* causes current to flow through the winding of relay 29 so that the first relay means 29 operates for a predetermined period of time, and then releases when capacitor 34*a* becomes charged. The opening of break contact 29*a* inserts resistor 31 in the H lead, thereby causing the line circuit 13 to assume its hold state, the value of resistor 31 having been chosen in accordance with the requirements of the line circuit for initiating the hold state. Also during the operation of relay means 29 contact 29*b* connects ground to the capacitor 36 through hookswitch make contact 17, break contact 37 of the intercom release key (not shown) and resistor 64. Capacitor 36 charges. The charging time of capacitor 36, and the mount of electrical energy stored therein are determined with reference to the duration of operation of first and second relay means 29, 28 to assure that capacitor 36 charges fully while relay means 29 is operated, and that when relay means 29 releases, relay means 28 is operated and held operated by the discharge from capacitor 36 for some desired period. The opening of contact 28*a* maintains the hold condition in line circuit 13 after the closing of contact 29*a*. While 28 is operated, the common power source E is connected via lead DC1 to the winding of relay means 42, incorporated in key telephone set 12, through its break contact 42*a*, from the circuit path including make contact 28*d* and line key make contact 32*a* to the lead DC1. Ground potential is connected to the other side of the winding of relay means 42 over the DS lead, via make contact 28*e*, break contacts 29*d* and 37 and make contact 17, operating relay means 42. When relay means 42 operates, the power source E is connected to its winding via make-before-break contact 42*a* holding it operated.

Also, upon the operation of relay means 28, ground is connected to the winding of a third relay means 24 via break contacts 29*c*, and make contact 28*c*; third relay means 24 is thereupon operated and is locked up by the closure of make contact 24*d*. The transmission network 22 is thereby trransferred to contacts 24*a* and 34*b* from the T and R conductor of the line circuit, which was previously placed into the hold state and maintains the office line connection, to the first and second windingso f relay means 77, causing 77 to operate by current from power source E.

When capacitor 36 is discharged, relay means 28 releases, relay means 42 is then held by current flow through resistor 65. In addition, ground is coupled through hookswitch break contact 46 of set 12 through make contact 42*b*, to buzzer 45, thereby giving an audible indication at that set of an incoming intercom call. It is to be understood that lamps for giving visual indications at set 12 of incoming intercom calls can also be employed.

At the same time, base current flows in transistor 56 of key telephone set 11, via the circuit path including hookswitch break contact 46 (FIG. 20), diode 60, make contact 42*c*, resistors 51, 52, leads DT and DR, and break contacts 55*a*, 55*b* of relay 55. Current then flows in the collector circuit of transistor 56, which is protected from reverse voltages by diode 56*a*, thereby operating relay 55. Closure of early make contact 55*c* holds transistor 56 on by connecting the base thereof to ground via break contacts 29*d* and 37, and make contact 17. Hence relay 55 remains operated.

At this time, a potential talking path between set 11 and set 12 has been established. One branch of this path extends from one terminal of transmission network 22 (FIG. 1) via make hookswitch contact 18, make contact 24*b*, contact 55*a*, lead DT, make contact 42*d* (FIG. 20), break contact 141'*a* of line key 141', break contact 141*a* of line key 141, to one terminal of transmission network 50. The other branch of this path extends from the second terminal of transmission network 22 via make contact 24*a*, make contact 55*b*, lead DR, make contact 42*e* (FIG. 20), break contact 141'*b* of line key 141', break contact 141*b* of line key 141, to the make hookswitch contact 49. This talking path is completed when the party at telephone set 12 lifts its handset, thereby closing hookswitch make contact 49 and opening hookswitch break contact 46, cutting off the buzzer 45. It is to be noted that this talking path is established without the requirement of operating any line key at key telephone set 12.

If the incoming call from the central office or PBX, which is being held at line circuit 13, is to be transferred to key telephone set 12, the user of that set operates his line key 141, connecting the T, R and H leads of the universal line circuit 13 to make contacts *a*, *b* and *c* respectively of line key 141. Ground is connected via hookswitch make contact 46 and hold key break contact 48 to the H lead, resulting in release of the holding condition at circuit 13, as described in detail above with reference to FIGS. 11–14, and the establishing of a talking path via the T and R leads between the incoming calling party and the transmission network 50 of key telephone set 12.

At this time, the operator of key telephone set 11 hangs up the handset, opening hookswitch contacts 17 and 18, the former releasing relay 24 in key telephone set 11 and relay 42 in key telephone set 12.

It should be noted that the user of key telephone set 12 can place the same call on hold by operation of its hold key to open break contact 48, thereby removing the direct ground from lead H.

In the event that key telephone set 12 is in use when the operator of key telephone set 11 is attempting to call the former via the intercom circuit, as described in detail above, relay 55 in key telephone set 11 does not operate, because the break contact 46 of the hookswitch in telephone set 12 is open. As a result, a busy tone signal from busy tone generator 72 is coupled via make contact 24*e*, break contact 28*b* and break contact 55*d* to winding 76 of relay 77. This busy tone signal is induced into windings 78, 79 of relay 77 and coupled therefrom via make contacts 24*a*, 24*b* to the transmission network 22, thereby indicating to the operator of key telephone set 11 that key telephone set 12 is busy.

Moreover, if the user of key telephone set 11 wishes to communicate with another key telephone set immediately after communication with key telephone set 12, intercom line key 33, for example, is operated, again placing ground on the circuit path through relay 29, which operates momentarily. As described above, after capacitor 34*a* charges fully, relay 29 releases. However, the operation of relay 29 opens its break contact 29*d*, removing ground from the base of transistor 56, and the winding of relay 42 in key telephone set 12. Relays 42 and 55 thereby release. In addition, break contact 29*c* also opens, removing ground from relay 24, which then releases. Accordingly, the intercom communication supervisory control circuit 15 is restored to its initial condition, preparatory to establishing an intercom connection to another key telephone set, and a connection is then subsequently established to the station corresponding to intercom key 33.

For convenience of explanation, the foregoing description of key telephone set 11 has been made with reference to only two office line keys 14, 14' therein. It is to be appreciated by those of skill in art, that a plurality of such line keys are incorporated in a typical key telephone set, each connecting to a different office line circuit such as 13, 13'. Moreover, it is to be appreciated by those of skill in the art that, although only two intercom circuits and keys 32, 33 have been shown for convenience of explanation, key telephone set 11 can be equipped with as many intercom keys as there are key telephone sets 12 in the system.

VI. Conclusion

While specific embodiments of this key telephone system invention have been disclosed, variations in procedural and structural detail within the scope of the appended claims are possible, and are contemplated. There is, therefore, no intention of limitation to the abstract, or the exact disclosure herein presented.

What is claimed is:

1. In a key telephone system comprising in combination a key service unit; a plurality of key telephone sets; at least one line circuit means for connecting said sets to an office line; at least one intercommunication line circuit means and intercommunication line circuit supervisory switching and control means, including register circuit means, for effecting interconnection of any one key telephone set in the system to another; and further wherein each of said key telephone sets incorporates a microphone and a loudspeaker; transmission network means; dial apparatus means; means for supplying outgoing voice representative signals generated by said microphone to said trasnsmission network means; means for supplying incoming voice representative signals, coupled to said transmission network, to said loudspeaker; and voice path switching circuit means for intercoupling said outgoing signal supplying means and said incoming signal supplying means to said transmission network and for maintaining said telephone set in its voice transmitting mode when said set is in the quiescent condition; the improvement wherein one of said key telephone sets serves all the other key telephone sets in the system as an operator attended station, said one key telephone set station additionally comprising circuit means, including a plurality of lamps, corresponding on a one-to-one basis to the plurality of other key telephone sets in the system, for indicating the status of each other key telephone set in the system; a like plurality of station selection key means and pairs of line conductor means, corresponding on a one-to-one basis to the plurality of other key telephone sets in the system, for interconnecting said operator attended station set to the plurality of other key telephone sets in the system; and means, responsive to the operation of a station selection key, a. for automatically holding a line circuit means operatively connected to said attended station set, b. for connecting the transmission network of said operator attended station set to the key telephone set corresponding to the operated selection key, over the corresponding pair of line conductors, and c. for supplying a calling signal to said last mentioned key telephone set.

* * * * *

UNITED STATES PATENT OFFICE
CERTIFICATE OF CORRECTION

PATENT NO. : 3,872,262

DATED : March 18, 1975

INVENTOR(S) : Stephen Kerman

It is certified that error appears in the above-identified patent and that said Letters Patent are hereby corrected as shown below:

| | |
|---|---|
| Col. 5, Line 51: | Change "signal" to --equal--. |
| Col. 6, line 66: | Change "conversion" to --conversation--. |
| Col. 7, line 66: | Change "Kazuryuki" to --Kazuyuki--. |
| Col. 10, line 8: | Change "curved" to --curve--. |
| Col. 22, line 6: | After "STC" delete remainder of line. |
| Col. 22, line 7: | Delete "the office line through STC". |
| Col. 22, line 32: | Change "or" to --of--. |
| Col. 22, line 43: | Change "d." to --e.--. |
| Col. 26, line 9: | Change "of" to --or--. |
| Col. 26, line 22: | Change "Ra" to --RA--. |
| Col. 31, line 47: | Change "10" to --tenth--. |
| Col. 31, line 49: | Change "10" to --ten--. |
| Col. 32, line 11: | Delete "2" first instance. |
| Col. 38, line 16: | Change "orifice" to --office--. |
| Col. 38, line 56: | Change "non-operated" to --non-operate--. |
| Col. 39, line 46: | Change "20" to --200--. |
| Col. 40, line 64: | Change "ilne" to --line--. |
| Col. 41, line 22: | Change "mount" to --amount--. |

On the Cover Sheet, the following should be added:

- [73] Assignee: Nippon TSU Shin Kogyo K.K. Kanagawa-Ken Japan and TIE/communications, Inc. -

Signed and Sealed this

*seventh* Day of *October 1975*

[SEAL]

*Attest:*

RUTH C. MASON
*Attesting Officer*

C. MARSHALL DANN
*Commissioner of Patents and Trademarks*